US009653836B2

(12) United States Patent
Aono et al.

(10) Patent No.: US 9,653,836 B2
(45) Date of Patent: May 16, 2017

(54) ELECTROTHERMAL HEATING DEVICE

(71) Applicant: Zojirushi Corporation, Osaka-shi (JP)

(72) Inventors: Tadayuki Aono, Osaka (JP); Masaaki Ombe, Osaka (JP); Takuya Ishii, Osaka (JP); Hayato Kawano, Osaka (JP)

(73) Assignee: Zojirushi Corporation, Osaka (JP)

( * ) Notice: Subject to any disclaimer, the term of this patent is extended or adjusted under 35 U.S.C. 154(b) by 1105 days.

(21) Appl. No.: 13/789,879

(22) Filed: Mar. 8, 2013

(65) Prior Publication Data
US 2013/0237077 A1 Sep. 12, 2013

(30) Foreign Application Priority Data

Mar. 9, 2012 (JP) .................. 2012-053431

(51) Int. Cl.
*H05B 3/68* (2006.01)
*H05B 3/08* (2006.01)
(Continued)

(52) U.S. Cl.
CPC ..... *H01R 13/4534* (2013.01); *H01R 13/4538* (2013.01); *A47J 37/0676* (2013.01); *H05B 3/06* (2013.01)

(58) Field of Classification Search
CPC ............ H01R 13/4534; H01R 13/4538; H01R 13/447; H01R 13/4532; H01R 13/639;
(Continued)

(56) References Cited

U.S. PATENT DOCUMENTS 3,538,306 A * 11/1970 Brunell ................ A61M 11/041
219/507
5,856,633 A * 1/1999 Zelkovsky ............... H02G 3/14
174/67
(Continued)

FOREIGN PATENT DOCUMENTS

JP 54132557 U 8/1979
JP 58061137 U 4/1983
(Continued)

*Primary Examiner* — Quang D Thanh
*Assistant Examiner* — Hemant Mathew
(74) *Attorney, Agent, or Firm* — The Webb Law Firm

(57) ABSTRACT

An electric heating device includes a box-shaped plug socket provided with a socket-side electroconductive part electrically connected to an electric heater; a power source plug provided with a plug-side electroconductive part electrically connectable to the socket-side electroconductive part and attachable to and detachable from the plug socket; a movement-restricting mechanism for restricting the movement of a protective member both toward and away from a socket-side electroconductive part in a protected state in which the protective member closes an opening of the plug socket and the socket-side electroconductive part are positioned within an interior space; and a switching mechanism for switching the protective member from a restricted movement state into a restriction released state, in which the restriction of movement by the movement restriction mechanism is released, as the power source plug is inserted into the plug socket.

10 Claims, 12 Drawing Sheets

(51) Int. Cl.
  *H01R 13/453* (2006.01)
  *A47J 37/06* (2006.01)
  *H05B 3/06* (2006.01)

(58) Field of Classification Search
  CPC H01R 13/64; H01R 13/6397; H01R 13/4536; A47J 37/0676; A47J 37/10; A47J 39/006; H01L 21/67248; H05B 3/00; H05B 3/748; H05B 3/688; H05B 3/06; A45C 11/20
  USPC .... 439/137, 135, 139, 140, 299, 924.2, 304, 439/138, 145; 219/450.1, 494, 214, 386, 219/387, 465.1–468.2, 541; 99/422
  See application file for complete search history.

(56) References Cited

U.S. PATENT DOCUMENTS

| | | | | |
|---|---|---|---|---|
| 6,536,458 B1 * | 3/2003 | Kindermann | ............. | E03B 7/12 137/341 |
| 6,537,089 B1 * | 3/2003 | Montague | .......... | H01R 13/4534 439/137 |
| 6,776,085 B1 * | 8/2004 | Tang | .................... | A47J 37/0676 219/386 |
| 6,935,874 B1 * | 8/2005 | Fang | .................... | A47J 37/0676 439/137 |
| 7,122,763 B1 * | 10/2006 | Liu | ........................ | A45C 11/20 219/214 |
| 7,635,827 B2 * | 12/2009 | Sie | ............................ | F24C 7/10 219/450.1 |
| 8,042,459 B2 * | 10/2011 | Wu | ........................ | A23B 4/052 126/25 R |
| 2004/0043649 A1 * | 3/2004 | O'Connell | ......... | H01R 13/6397 439/135 |
| 2009/0090250 A1 * | 4/2009 | Zhou | .................... | A47J 37/0676 99/422 |
| 2010/0116811 A1 * | 5/2010 | Liu | ...................... | A47J 37/0709 219/450.1 |

FOREIGN PATENT DOCUMENTS

| | | |
|---|---|---|
| JP | 10160 A | 1/1998 |
| JP | 11239534 A | 9/1999 |
| JP | 3243444 B2 | 1/2002 |

* cited by examiner

ELECTROTHERMAL HEATING DEVICE

BACKGROUND OF THE INVENTION

1. Field of the Invention

The present invention relates to an electrothermal heating device provided with a box-shaped plug socket provided with a socket-side electroconductive part electrically connected to an electrothermal heater and with an opening, and a power source plug provided with a plug-side electroconductive part electrically connectable with the socket-side electroconductive part, the plug being insertable into and removable from the plug socket via the opening.

2. Description of the Related Art

Examples of such electrothermal heating device include heated cooking appliances (hotplates, meat grills, grill pans, Japanese takoyaki makers, etc.), electric pots, electric kettles, humidifiers, and other electrothermal heating device provided with an electrothermal heater. Such electrothermal heating device are configured so that electrical power from a power source is supplied to the electrothermal heater via the power source plug inserted in the plug socket, and heat generated by the electrothermal heater heats an object to be heated.

For example, in the heated cooking appliances constituting examples of electrothermal heating device disclosed in patent documents 1 and 2, a power source plug provided with a plug-side electroconductive part electrically connected to a power source is inserted into a box-shaped plug socket provided with a socket-side electroconductive part electrically connected to an electrothermal heater via an opening in the plug socket. When the power source plug is inserted in the plug socket, the plug-side electroconductive part and the socket-side electroconductive part are electrically connected, and electrical power from the power source is supplied to the electrothermal heater. A cooking plate constituting an object of heating, the plate being disposed near the electrothermal heater or in contact with the electrothermal heater, is thereby heated, and a food product of the like can be placed upon an upper surface of the cooking plate and cooked by heating.

In these heated cooking appliances, the box-shaped plug socket is attached to a side surface of the cooking plate, and a pair of electroconductive pins (an example of a socket-side electroconductive part) constituting a connecting terminal of the electrothermal heater, integrally formed with the cooking plate are formed so as to project horizontally from the side surface of the cooking plate towards the opening of the plug socket when positioned within the plug socket. A closing plate for closing the opening of the plug socket shut when the pair of electroconductive pins is positioned within the plug socket is provided.

In the heated cooking appliance disclosed in document 1, the closing plate is rotatable around a rotational shaft provided at one end of the closing plate, and, in its natural state, is drawn in a closing rotational direction closing the opening of the plug socket by a biasing spring so as to close the opening. The closing plate is provided with an opening force receiving part at a location closer to one end than the rotational shaft for receiving pressure in an insertion direction from a heat-sensitive post of the power source plug and rotating the closing plate around the rotational shaft in an opening rotational direction opposite to the closing rotational direction. The heat-sensitive post thereby presses the opening force receiving part in the insertion direction as the power source plug is inserted into the plug socket, and the closing plate is rotated in the opening rotational direction around the rotational shaft in opposition to the biasing force of the biasing spring, causing the opening to open. With the opening thus in an open state, the power source plug is inserted into the opening of the plug socket.

Meanwhile, in the heated cooking appliance disclosed in document 2, the closing plate is disposed so as to close the opening in a position entering beyond the opening into the plug socket. The closing plate is slidable in a sliding direction that is the same direction as the direction in which the power source plug is removed from the plug socket, and, in its natural state, is urged by the biasing spring in the sliding direction towards the opening, and is disposed in contact with a guide part formed projecting inward within the plug socket. The closing plate is also provided with a contacted surface orthogonal to the sliding direction, and is configured so that, as the power source plug is inserted into the plug socket, a contacting surface formed on the power source plug orthogonally to the insertion/removal direction and the contacted surface come into contact, and are slidable in the sliding direction while resisting the pressing force of the biasing spring. The closing plate being made to slide in the sliding direction by the power source plug in this way causes the power source plug to be inserted into the opening of the plug socket.

PRIOR ART LITERATURE

Patent Literature

[Patent Document 1] Japanese Patent 3243444
[Patent Document 2] JP (Kokai) H10-000160

SUMMARY OF THE INVENTION

The socket-side electroconductive part electrically connected to the electrothermal heater is heated to an extremely high temperature by conducted heat from the electrothermal heater, and there is a chance of a user suffering burns or the like if the socket-side electroconductive part is accidentally touched. In addition, if dirt or the like adheres to the socket-side electroconductive part, or if it is deformed from impact with an object, the contact resistance between the socket-side electroconductive part and the plug-side electroconductive part of the power source plug will increase, leading to the risk of heat being given off at that part.

Now giving consideration to the state of disposition of the socket-side electroconductive part, in the heated cooking appliance disclosed in patent document 1, the electroconductive pins acting as a socket-side electroconductive part are disposed so as to be positioned within a space within the plug socket closed off by the closing plate, and the entirety of the electroconductive pins is enclosed by the inner surface of the plug socket and the inner surface of the closing plate. However, although the closing plate is biased and drawn toward the closing rotational direction around the rotational shaft in its natural state, and the closing plate is configured so as not to be able to move toward the electroconductive pins, the closing plate is configured so as to be able to move away from the electroconductive pins, i.e., so as to be able to rotate in the opening rotational direction around the rotational shaft. Thus, this configuration allows, for example, a user to manually rotate the closing plate closed off the opening of the plug socket around the rotational shaft in the opening rotational direction, and, in this state, there is the possibility of the user's hand contacting the electroconductive pins, of dirt adhering thereto, or of an object colliding therewith.

Meanwhile, in the heated cooking appliance disclosed in document 2, while the electroconductive pins acting as a socket-side electroconductive part are disposed within the plug socket, the closing plate is slidable in the insertion/removal direction (closing plate sliding direction) of the power source plug, thus allowing the closing plate to be pressed in the sliding direction. Therefore, when, for example, a user manually presses the closing plate in the sliding direction, the tips of the electroconductive pins are exposed to the exterior of the closing plate through pin insertion holes formed in the closing plate, with the possibility of a user's hand touching the electroconductive pins, dirt adhering thereto, or an object colliding therewith.

Furthermore, even if a user does not manually press the closing plate in the sliding direction, the closing plate, which is positioned within the plug socket in its natural state, is pressed against a guide by the biasing spring. Although the contents of the drawing do not explicitly show it, a comprehensive interpretation thereof suggests that, in this state, the tips of the electroconductive pins are exposed to the exterior of the closing plate through the pin insertion holes of the closing plate disposed within the plug socket. Such a configuration raises the possibility of a user's hand touching the electroconductive pins, dirt or the like adhering thereto, or an object colliding therewith.

The present invention was contrived in the light of the foregoing circumstances, and has as an object thereof the provision of an electrothermal heating device that can prevent, through a simple configuration, accidental contact by a user's hand with a socket-side electroconductive part disposed within a plug socket, or the adherence of dirt or the like thereupon, while an power source plug can be reliably plugged into the plug socket.

Means of Solving the Problem

The electrothermal heating device according to the present invention for attaining the above object includes:

a box-shaped plug socket provided with a socket-side electroconductive part electrically connected to an electrothermal heater, and provided with an opening;

a power source plug provided with a plug-side electroconductive part electrically connectable with the socket-side electroconductive part, the plug being insertable into and removable from the plug socket via the opening; wherein the device comprises:

a protective member for closing the opening of the plug socket and positioning the socket-side electroconductive part within an interior space;

a movement-restricting mechanism for restricting the movement of the protective member both towards and away from the socket-side electroconductive part in a protected state in which the socket-side electroconductive part is positioned within the interior space closed off by the protective member; and a switching mechanism for switching from a restricted movement state in which the movement of the protective member is restricted by the movement-restricting mechanism to a released-restriction state in which restriction by the movement-restricting mechanism is released as the power source plug is inserted into the plug socket.

In accordance with this characterizing configuration, the protective member closes the opening of the box-shaped plug socket and forms an interior space (closed space) within the plug socket, creating a protected state in which the socket-side electroconductive part is positioned within the interior space. This allows for a state in which the socket-side electroconductive part is isolated from the exterior of the plug socket by the protective member, and thus there can be prevented contact by a user's hand with the socket-side electroconductive part, the adherence of dirt or the like thereto, and collisions by objects therewith.

In additionally, because the movement-restricting mechanism restricts the movement of the protective member both toward and away from the socket-side electroconductive part in the protected state in which the socket-side electroconductive part is positioned within the interior space, movement of the protective member toward and away from the socket-side electroconductive part can be reliably restricted within the range of the protected state in which the socket-side electroconductive part is protected by the protective member, even if the power source plug is not inserted into the plug socket. The protected state is a state in which the socket-side electroconductive part is positioned in the interior space of the plug socket closed off by the protective member (i.e., a state in which the socket-side electroconductive part is not exposed to the exterior of the plug socket and the protective member); and, as long as the socket-side electroconductive part is positioned within the interior space, it is acceptable for the protective member to be capable of moving toward or away from the socket-side electroconductive part within a predetermined range, or for the protective member to be incapable of moving toward or away from the socket-side electroconductive part.

It is thereby possible to maintain the state of the socket-side electroconductive part being positioned within the interior space closed off by the protective member (i.e., the protected state) even if a force in a direction moving toward or away from the socket-side electroconductive part works upon the protective member. Therefore, it is possible to reliably prevent contact by a user's hand with the socket-side electroconductive part, the adherence of dirt or the like thereto, and collisions by objects therewith.

Furthermore, because the switching mechanism switches from a restricted movement state in which the movement of the protective member is restricted by the movement-restricting mechanism to a released-restriction state in which restriction by the movement-restricting mechanism is released as the power source plug is inserted into the plug socket, there is no need for an act or configuration for the movement-restricting mechanism to switch the restricted movement state to the released-restriction state apart from the act of inserting the power source plug, allowing for a simple switching mechanism configuration. It is thereby possible for the movement-restricting mechanism to easily switch from the restricted movement state to the released-restriction state without impeding the insertion of the power source plug, and indeed utilizing the insertion of the power source plug.

It is thereby possible to reliably prevent accidental contact by a user's hand with a socket-side electroconductive part disposed within a plug socket, or the adherence of dirt or the like thereupon, through a simple configuration, and to reliably plug the power source plug into the plug socket.

Another characterizing feature of the electrothermal heating device according to the present invention is that the protective member is provided with a protective plate for closing the opening of the plug socket opening in a horizontal direction, and the movement-restricting mechanism is provided with an obstructor plate that is slidable in the vertical direction with respect to the protective plate and disposed on the protective plate, a lower part of the obstructor plate is configured to mates with a mating hole formed in the plug socket when the obstructor plate descends, and the restricted movement state is made in which the movement of the protective plate both toward and away from the socket-side electroconductive part is restricted.

According to the aspect described above, the movement-restricting mechanism is provided with an obstructor plate on the protective plate acting as a protective member for closing off the opening in the horizontal direction of the plug socket, the obstructor plate being slidable in the vertical direction with respect to the protective plate, and the obstructor plate descends so that a lower part thereof mates with the mating hole formed in the plug socket, allowing the obstructor plate to be mated with the mating hole without the need for motive force, and allowing a mated state to be reliably maintained by the weight of the obstructor plate itself when the obstructor plate is mated with the mating hole. Because the obstructor plate is provided on the protective plate, the obstructor plate is kept in a state in which the movement thereof both toward and away from the socket-side electroconductive part is restricted, thereby maintaining the protective plate in a similar restricted movement state. The mating hole is formed as a cutout in the plug socket, in a location where the protective plate is placed into the restricted movement state when the obstructor plate disposed in the protective plate descends and the lower part of the obstructor plate mates and where the protected state is maintained in which the socket-side electroconductive part is positioned within the interior space.

It is thereby possible to reliably restrict the movement of the protective plate both toward and away from the socket-side electroconductive part through the extremely simple configuration of providing an obstructor plate and a mating hole acting as a movement-restricting mechanism, and having the obstructor plate descend, for example, under its own weight so that a lower part thereof mates with the mating hole. It is thus possible to more reliably maintain a state in which the socket-side electroconductive part is positioned within the interior space closed off by the protective member (i.e., the protected state) using a simply configured movement-restricting mechanism, allowing for more reliable prevention of user hand contact with or adherence of dirt upon the socket-side electroconductive part.

Another characterizing feature of the electrothermal heating device according to the present invention is that the switching mechanism is provided with an insertion guide formed projecting outward at a location on the power source plug facing the protective plate, the insertion guide being configured so as to be insertable into a protective plate hole formed through the protective plate and an obstructor plate hole formed in the obstructor plate; and, in the restricted movement state in which the lower part of the obstructor plate is mated with the mating hole, the protective plate hole and the obstructor plate hole form an overlapping part and the obstructor plate hole is disposed at a position offset downwards with respect to the protective plate hole, in which configuration the insertion guide moves the obstructor plate upward relative to the protective plate as the power source plug is inserted into the plug socket, so that the restricted movement state, in which the movement of the protective plate is restricted by the obstructor plate, is switched to the released-restriction state.

According to the aspect described above, the switching mechanism is provided with an insertion guide formed projecting outward at a location on the power source plug facing the protective plate, the insertion guide being configured so as to be insertable into a protective plate hole formed through the protective plate and an obstructor plate hole formed in the protective plate, thereby utilizing the act of inserting the power source plug into the plug socket to allow the protective plate to be switched from the restricted movement state to the released-restriction state without the need for a separate action.

Specifically, when the insertion guide of the power source plug is not inserted into the protective plate hole and the obstructor plate hole (i.e., the power source plug is not inserted into the plug socket), the obstructor plate descends, for example, under its own weight and a lower part thereof (a non-open part) mates with the mating hole, entering a restricted movement state, and the movement of the protective plate both toward and away from the socket-side electroconductive part is restricted. In this restricted movement state, the obstructor plate hole is disposed in a position offset downwards with respect to the protective plate hole with the protective plate hole and the obstructor plate hole forming an overlapping part.

Meanwhile, when the insertion guide of the power source plug is inserted into the protective plate hole and the obstructor plate hole (i.e., the power source plug is inserted into the plug socket), the insertion guide is inserted into the part where the protective plate hole and the obstructor plate hole overlap. When the insertion guide passes through the obstructor plate hole offset downward with respect to the protective plate hole, an upper side of the insertion guide contacts the upper inner surface of the obstructor plate hole, raising the obstructor plate, and the lower part of the obstructor plate exits the mating hole. When the insertion guide is inserted into the obstructor plate hole, the lower part of the obstructor plate is kept unmated with the mating hole (i.e., the obstructor plate does not descend, for example, under its own weight). The insertion guide thereby moves the obstructor plate upward relative to the protective plate as the power source plug is inserted into the plug socket, allowing for easy switching from the restricted movement state, in which the movement of the protective plate is restricted by the obstructor plate, to the released-restriction state.

The act of inserting the power source plug into the plug socket is thus utilized to allow the protective plate to be simply and easily switched from the restricted movement state to the released-restriction state without the need for a separate action.

Another characterizing feature of the electrothermal heating device according to the present invention is that the protective plate and the obstructor plate are disposed at least in the stated order from the opening, and the protective plate hole has a long hole shape in the vertical direction.

According to the aspect described above, the protective plate and the obstructor plate are disposed at least in the stated order from the opening, so that the insertion guide is inserted at least first into the protective plate hole and then into the obstructor plate hole through the part where the protective plate hole and the obstructor plate hole overlap. In the restricted movement state, prior to the power source plug being inserted into the plug socket, the obstructor plate hole is disposed in a position offset downward with respect to the protective plate hole. Thus, there is the possibility of difficulty in inserting the insertion guide into the part where the protective plate hole and the obstructor plate hole overlap if the area of the overlapping part is small.

However, because the protective plate hole has a long hole shape in the vertical direction According to the aspect described above, the area of the part overlapping with the obstructor plate hole of the obstructor plate, which is disposed in a position offset downward with respect to the protective plate hole, can be increased, the insertion guide can be simply and reliably inserted into the part where the protective plate hole and the obstructor plate hole overlap in the restricted movement state. Even if the comparative area of the part where the protective plate hole and the obstructor plate hole overlap in the restricted movement state is increased in this way, the restriction of movement by the switching mechanism can be more easily released while ensuring the move restriction performance of the movement-restricting mechanism without impeding the mating of the lower part of the obstructor plate with the mating hole.

The act of inserting the power source plug into the plug socket is thus utilized to allow the protective plate to be more simply and easily switched from the restricted movement state to the released-restriction state without the need for a separate action.

Another characterizing feature of the electrothermal heating device according to the present invention is that the insertion guide is a heat-sensitive post, provided on the power source plug, and directly or indirectly contacting an object of heating heated by the electrothermal heater.

According to the aspect described above, the insertion guide is a heat-sensitive post, provided on the power source plug, that directly or indirectly contacts the object of heating being heated by the electrothermal heater, so that the heat-sensitive post of the power source plug, which is used to detect the temperature of the object of heating, can be used as the insertion guide for switching from the restricted movement state effected by the obstructor plate provided on the protective plate to the released-restriction state, allowing for a simple switching mechanism configuration not requiring a separate insertion guide to be formed.

Another characterizing feature of the electrothermal heating device according to the present invention is that a tapered tip that decreases in diameter toward the end of the insertion tip is formed on the tip of the heat-sensitive post.

According to the aspect described above, a tapered tip that decreases in diameter toward the end of the insertion tip is formed on the tip of the heat-sensitive post, so that, when the heat-sensitive post of the power source plug is inserted into the part where the protective plate hole and the obstructor plate hole overlap, the cross-sectional area of the heat-sensitive post inserted into the overlapping part can be reduced compared to cases in which a tapered tip is not formed, allowing for easier and more reliable insertion even if the area of the overlapping part is comparatively small. In addition, when the tapered tip is successively inserted into the overlapping part, the obstructor plate can be smoothly and successively raised along the outer circumference of the tapered tip and the heat-sensitive post, which has a greater diameter than the tapered tip.

Another characterizing feature of the electrothermal heating device according to the present invention is that the protective member is disposed so as to be slidable in a sliding direction coinciding with an insertion/removal direction in which the power source plug is inserted into and removed from the plug socket.

According to the aspect described above, the protective member is disposed so as to be slidable in a sliding direction coinciding with an insertion/removal direction in which the power source plug is inserted into and removed from the plug socket, so that, when the power source plug is inserted into the plug socket, the insertion direction of the power source plug and the sliding direction of the protective member coincide, and the protective member having been switched by the switching mechanism from the restricted movement state to the released-restriction state is more simply and efficiently made to slide in the sliding direction, allowing the power source plug to be inserted into the plug socket.

Another characterizing feature of the electrothermal heating device according to the present invention is that the power source plug is provided with a contacting surface orthogonal to the insertion/removal direction and the protective member is provided with a contacted surface orthogonal to the sliding direction, the contacting surface of the power source plug and the contacted surface of the protective member coming into contact as the power source plug is inserted into the plug socket, and the power source plug causing the protective member to slide in the sliding direction.

According to the aspect described above, the contacting surface of the power source plug formed orthogonally to the sliding direction (insertion/removal direction) and the contacted surface of the protective member come into contact as the power source plug is inserted into the plug socket, allowing the power source plug to slide the protective member in the sliding direction in a stabilized state.

Another characterizing feature of the electrothermal heating device according to the present invention is that biasing members for biasing the protective member into the protected state along the sliding direction are provided at both ends of the protective member in a direction orthogonal to the sliding direction.

According to the aspect described above, biasing members for biasing the protective member in the sliding direction into the protected state are provided at both ends of the protective member in a direction orthogonal to the sliding direction, so that the protective member is biased by the biasing force of the pair of biasing members at both ends of the protective member, allowing the protected state, in which the socket-side electroconductive part is positioned within the interior space of the plug socket closed off by the protective member, to be more stably maintained, and the sliding of the protective member in the sliding direction to be stabilized. In the protected state, the movement of the protective member both toward and away from the socket-side electroconductive part is restricted by the movement-restricting mechanism.

Another characterizing feature of the electrothermal heating device according to the present invention is that the socket-side electroconductive part is constituted by electroconductive pins formed projecting outward on the opening side, and the protective member is disposed so as to be slidable in the sliding direction with the electroconductive pins capable of being inserted into a the pin insertion holes formed in the protective member.

According to the aspect described above, the socket-side electroconductive part is constituted by electroconductive pins formed projecting outward on the opening side, so that, when the power source plug is inserted into the plug socket, the electroconductive pins are inserted into a recession formed in the power source plug that extends to the plug-side electroconductive part, allowing for easy and reliable insertion of the power source plug into the plug socket. Because the protective member is disposed so as to be slidable in the sliding direction with the electroconductive pins being capable of insertion into a pin insertion holes formed in the protective member, thereby avoiding the sliding of the protective member being impeded by the presence of the electroconductive pins.

Another characterizing feature of the electrothermal heating device according to the present invention is that the power source plug and the plug socket are provided with a connection-maintaining mechanism for keeping the socket-side electroconductive part in a state of electrical connection with the plug-side electroconductive part when the power source plug is inserted into the plug socket.

According to the aspect described above, because the power source plug and the plug socket are provided with connection-maintaining mechanisms, the socket-side electroconductive part can be reliably kept in a state of electrical connection with the plug-side electroconductive part when the power source plug is inserted into the plug socket. It is thereby possible to reliably prevent the electrical connection of the socket-side electroconductive part and the plug-side electroconductive part from being broken after the power source plug has been inserted into the plug socket, even if some external force in a direction moving the power source plug and the plug socket away from each other is applied.

Another characterizing feature of the electrothermal heating device according to the present invention is that the plug socket is provided with a grip integrally formed at a position lower than the location at which the protective member is disposed.

According to the aspect described above, the plug socket is provided with a grip integrally formed at a position lower than the location at which the protective member is disposed, so that, when a user attempts to grasp the plug socket, the user is led to grasp the grip, which is in a comparatively safe location separate from the location at which the protective member is provided, rather than mistakenly grasping near the protective member disposed on the plug socket.

When the power source plug is not inserted into the plug socket, the socket-side electroconductive part is in the protected state of being disposed within the interior space of the plug socket closed off by the protective member, and the movement-restricting mechanism effects a restricted movement state in which the movement of the protective member is restricted so as to bring about the protected state. Although the chances of touching the socket-side electroconductive part are extremely small even if the user grasps near the protective member, consideration is thus given to preventing the user from grasping near the protective member in order to further improve safety.

DESCRIPTION OF THE PREFERRED EMBODIMENTS

An embodiment of a heated cooking appliance will be described with reference to the drawings as an example of the electrothermal heating device according to the present invention. Examples of heated cooking appliances include hotplates, meat grills, grill pans, Japanese takoyaki makers, and the like, but the following description will feature an embodiment of a hotplate.

As shown in FIGS. 1-4, a hotplate H is provided with a deep dish-shaped main cooking device unit 1, a dish-shaped water dish 2 freely placeable upon and removable from the main cooking device unit 1, a plate-shaped cooking plate 3 (example of an object of heating) disposed above the dish-shaped water dish 2 and removably resting upon the main cooking device unit 1, and an electrothermal heater 4 (see FIG. 4) that receives electrical power from a power source (not shown) such as an AC power source and generates heat, heating the cooking plate 3.

Figure 6A:
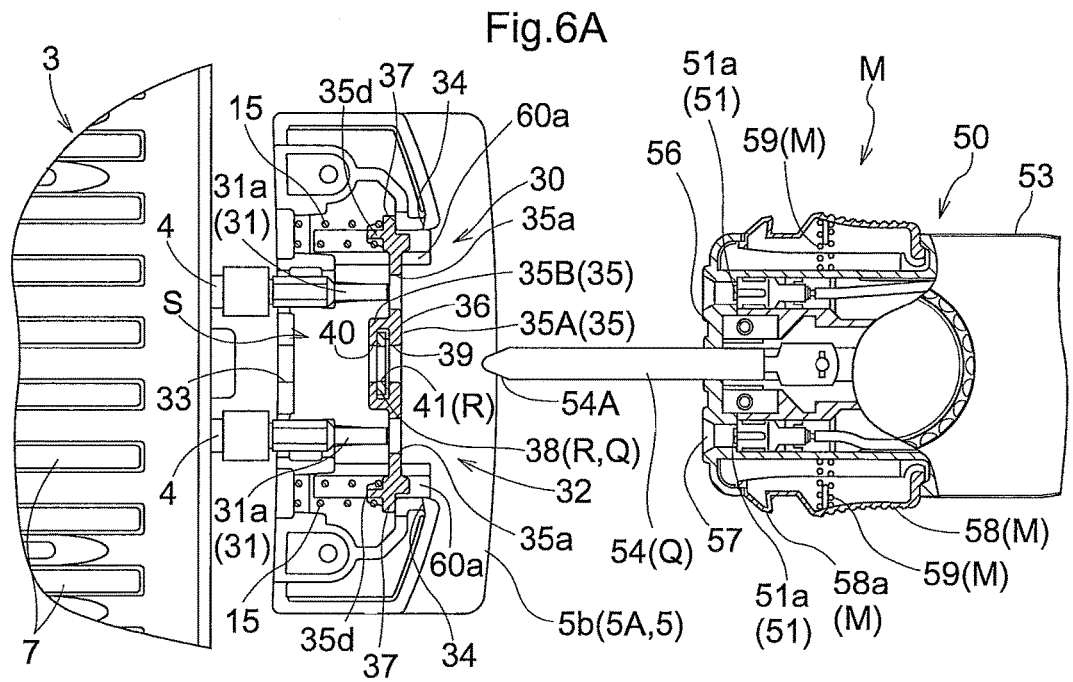
FIG. 6A is a partial magnified cross-sectional view of the vicinity of a plug socket of a cooking plate having been placed upon a main cooking device unit.
Figure 9A:
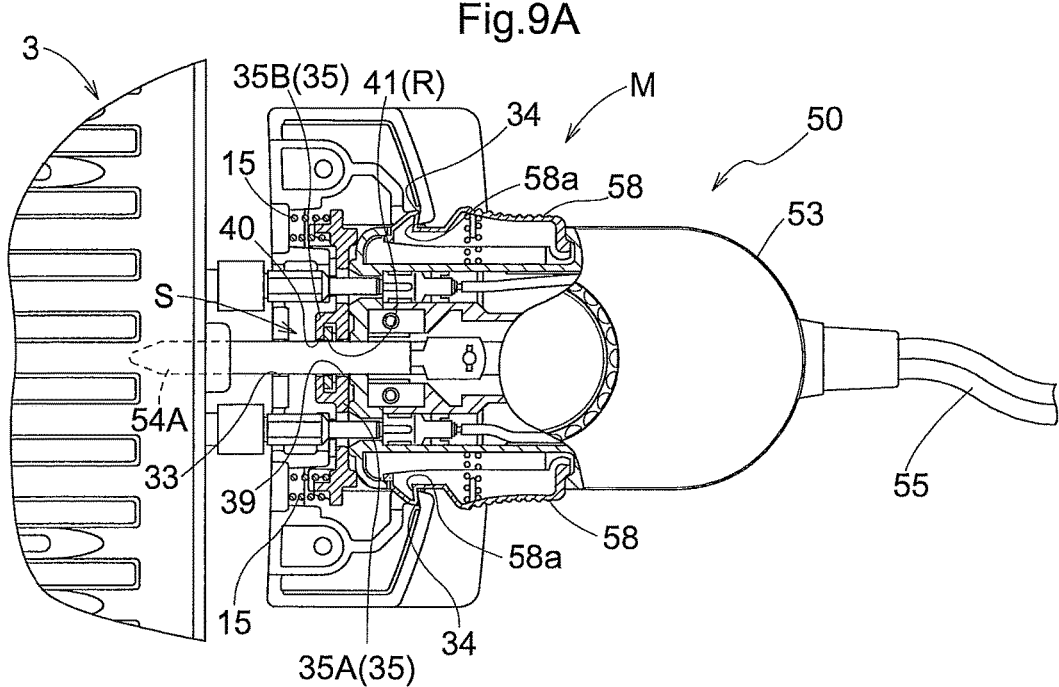
FIG. 9A is a partial magnified cross-sectional view of the vicinity of a plug socket with a power source plug inserted therein.
Figure 9B:
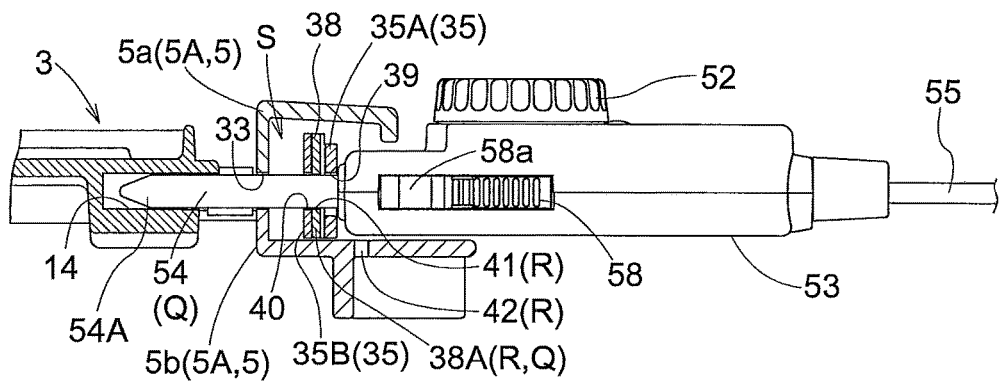
FIG. 9B is a partial magnified longitudinal-sectional view of the vicinity of the plug socket.
Figure 9C:
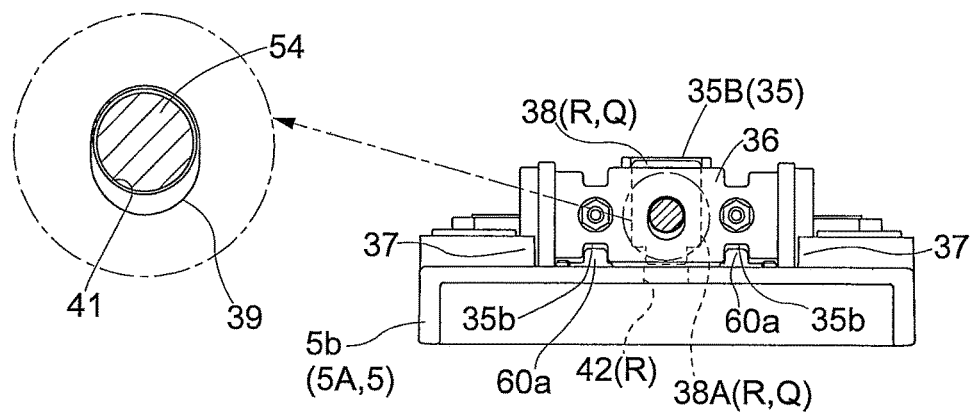
FIG. 9C is a side surface view of the vicinity of the plug socket.

As shown in FIGS. 1,2, and 5-9, the hotplate H is provided with a box-shaped plug socket 30 provided with a socket-side electroconductive part 31 electrically connected to the electrothermal heater 4 and an opening 32, and, as shown in FIGS. 6 and 9, a power source plug 50 provided with a plug-side electroconductive part 51 electrically connectable to the socket-side electroconductive part 31 and insertable into and removable from a plug socket 30 via the opening 32.

Figure 2:
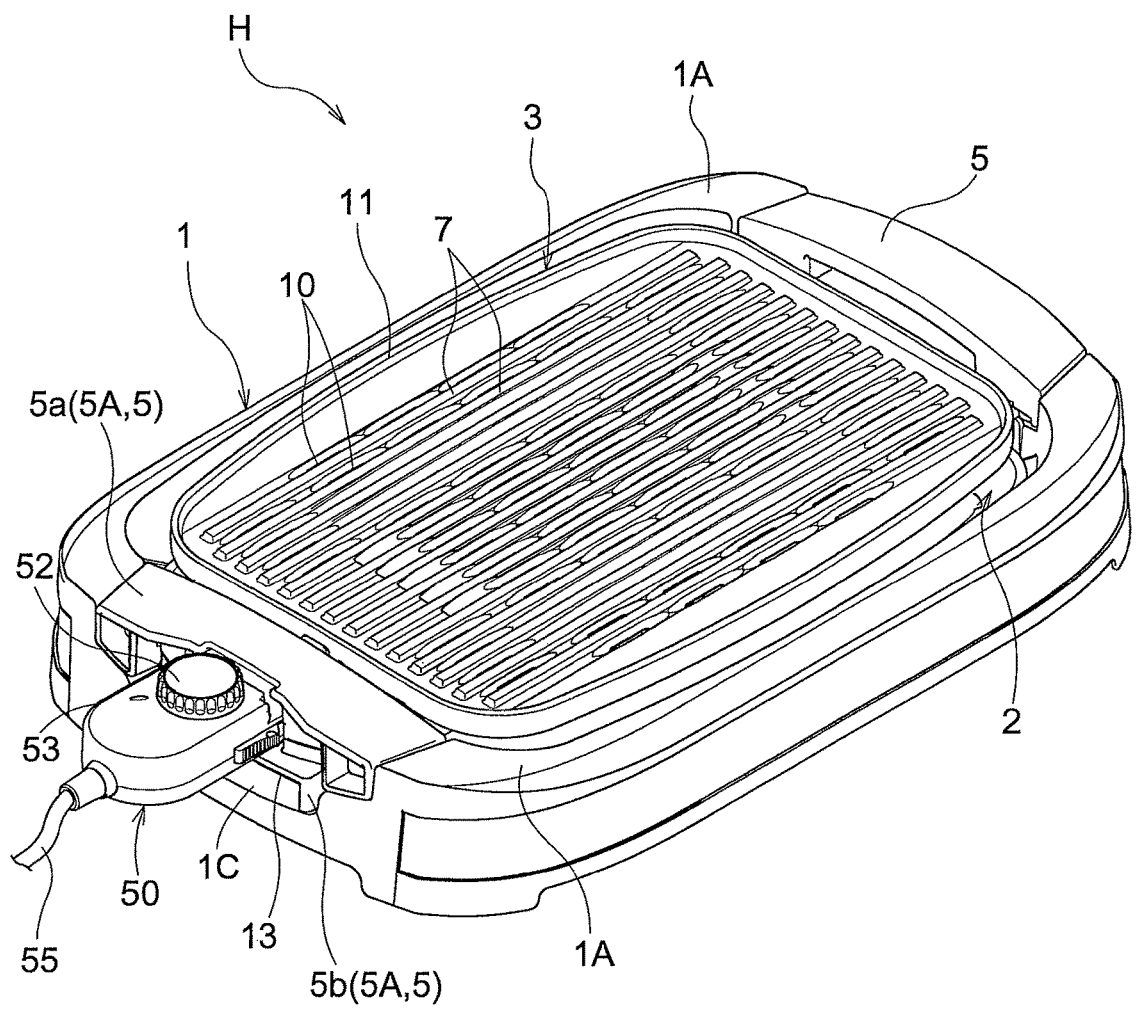
FIG. 2 is a perspective view of a hotplate.

In this way, as shown in FIGS. 2 and 9, the hotplate H is configured so that the plug-side electroconductive part 51 and the socket-side electroconductive part 31 are electrically connected when the power source plug 50 is inserted into the plug socket 30 via the opening 32, and electrical power from the power source is supplied to the electrothermal heater 4. The hotplate H then heats the cooking plate 3 using heat generated by the electrothermal heater 4, and a food product such as meat can be placed on the surface (top surface) of the cooking plate 3, heated, and cooked.

The configuration of the various parts of the hotplate H will be described.

Figure 1:
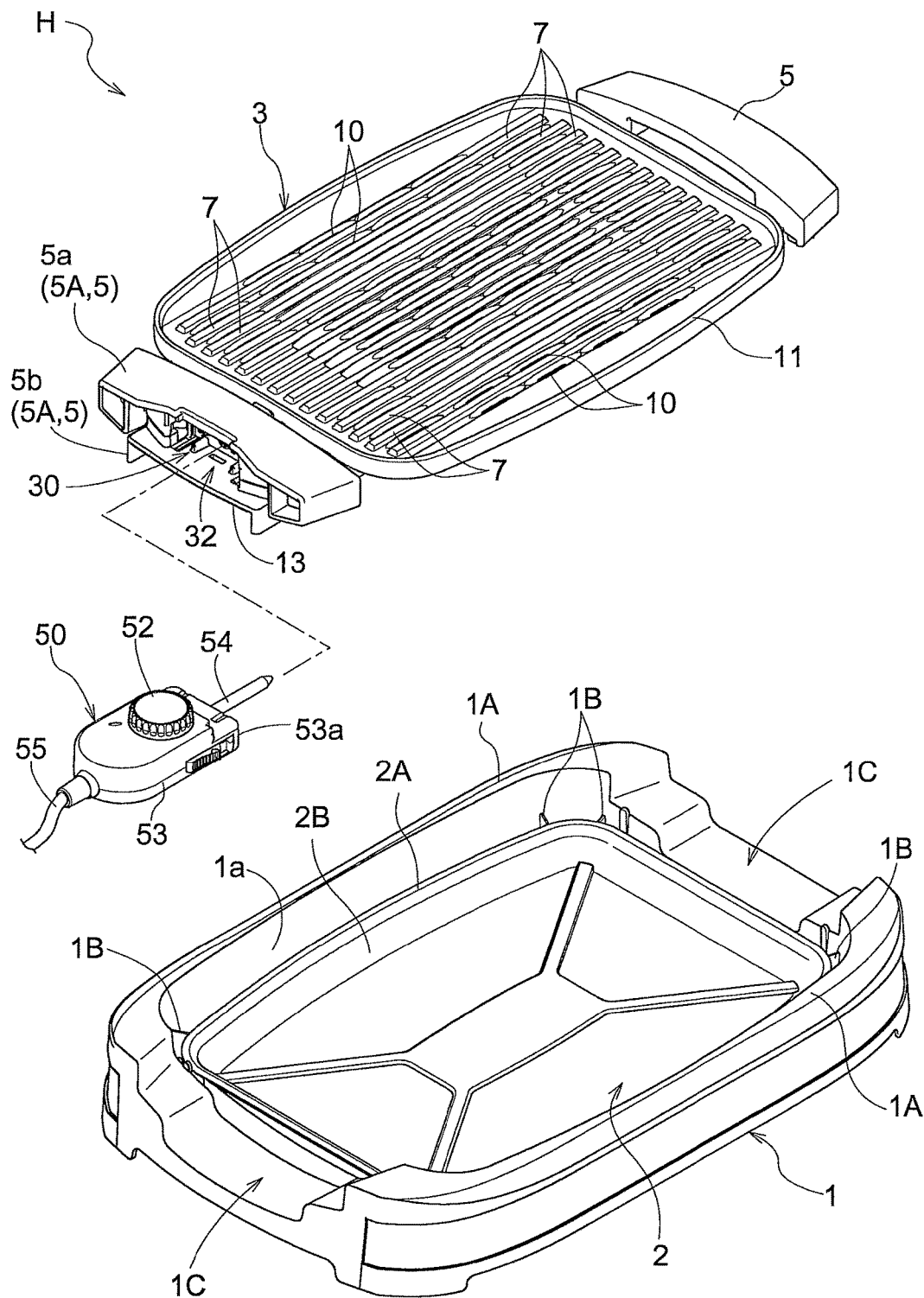
FIG. 1 is an exploded perspective view of a hotplate.

As shown in FIGS. 1 and 2, the main cooking device unit 1 is constituted by a heat-resistant resin member having an approximate rectangular shape (i.e., a rounded rectangular shape the four corners of which are formed as curves) as seen in plan view, and a deep dish shape as seen in cross section. An underside opening (not shown) which is a through-hole extending vertically is formed in the underside of the main cooking device unit 1, and a total of four legs (not shown) for resting the cooking device on a table or the like are provided around the underside opening.

A ring-shaped, upward-projecting outer edge wall 1A is formed at the outer edge of the main cooking device unit 1, and a plurality of inward-projecting plate-shaped supports 1B upon which the water dish 2 is rested is formed on an inner circumferential surface 1a of the outer edge wall 1A. A pair of plate-shaped supports 1B is disposed at each of the four corners of the main cooking device unit 1 (for a total of eight in the present embodiment).

The main cooking device unit 1 is provided, at a pair of central positions (on the short sides) in the outer edge wall 1A opposing each in the lengthwise direction, with a pair of handle holders 1C upon which a pair of handles 5, attached to the cooking plate 3 as will be described later, are rested and held. The handle holders 1C are formed as downward indentations in the upper surface of the outer edge wall 1A.

Specifically, the upper surfaces of the handle holders 1C correspond in shape to the lower side of the handles 5, and are formed as stepped indentations the central portions of which are positioned lower than the end portions thereof. In other words, the handle holders 1C are formed as downward indentations in the upper surface of the outer edge wall 1A such that, when the handles 5 are rested and held in the handle holders 1C, the upper surfaces of the handles 5 are substantially flush with the upper surface of the outer edge wall 1A (i.e., as indentations having substantially the same length in the vertical direction as that of the handles 5). The handle holders 1C are formed so as to be slightly wider than the handles 5 so as to avoid clattering when the handles 5 are rested and held in the handle holders 1C. The handle holders 1C are also formed so that, when the handles 5 are rested and held in the handle holders 1C, the outer end walls of the handle holders 1C in the lengthwise direction of the main cooking device unit 1 are substantially flush with the outer end walls of the handles 5. In other words, the handles 5 of the cooking plate 3 are rested and held in the handle holders 1C so as not to project outwards beyond the main cooking device unit 1 in the lengthwise direction thereof.

The water dish 2 is a metal member having an approximate rectangular shape (i.e., a rounded rectangular shape the four corners of which are formed as curves) as seen in plan view that is smaller overall than the main cooking device unit 1, and a deep dish shape as seen in cross section. The water dish 2 is provided with a rim 2A projecting horizontally outward around the entire circumference of the outer edge thereof, and a downward swelling part 2B formed to the inside of the rim 2A and swelling downward, and is configured so as to be capable of storing water within the downward swelling part 2B. The water dish 2 is configured so that, when the outer surface of the downward swelling part 2B is in contact with the inner surface of the plurality of plate-shaped supports 1B, the water dish 2 can be stably rested within the main cooking device unit 1 by resting the rim 2A on the upper parts of the plurality of the plate-shaped supports 1B, holding the water dish 2 horizontally level. Water stored within the downward swelling part 2B is thus prevented from carelessly escaping from the water dish 2.

As shown in FIGS. 1-4, the cooking plate 3 is constituted by a flat, plate-shaped metal member having an approximate rectangular shape (i.e., a rounded rectangular shape the four corners of which are formed as curves) as seen in plan view that is slightly smaller overall than the main cooking device unit 1.

In the present embodiment, front surface ridges 7 projecting from the front surface of the cooking plate 3, rear surface ridges 8 projecting from the rear surface thereof, and an electrothermal heater 4 are cast integrally with the cooking plate 3.

As shown in FIGS. 1-3 and 5, the front surface ridges 7 projecting upward from the front surface of the cooking plate 3 in the lengthwise direction thereof are formed in a plurality of rows (14 in the present embodiment) disposed in parallel to one another, with a plurality of through-holes 10 penetrating from the front surface through to the rear surface formed between adjacent ridges. The through-holes 10 are formed in an approximate rectangular elongated shapes as seen in plan view, with the lengthwise direction thereof following the lengthwise direction of the cooking plate 3. In addition, a front surface outer edge convexity 11 projecting upward from the front surface is integrally formed around substantially the entire circumference of the outer edge of the front surface of the cooking plate 3.

Figure 4:
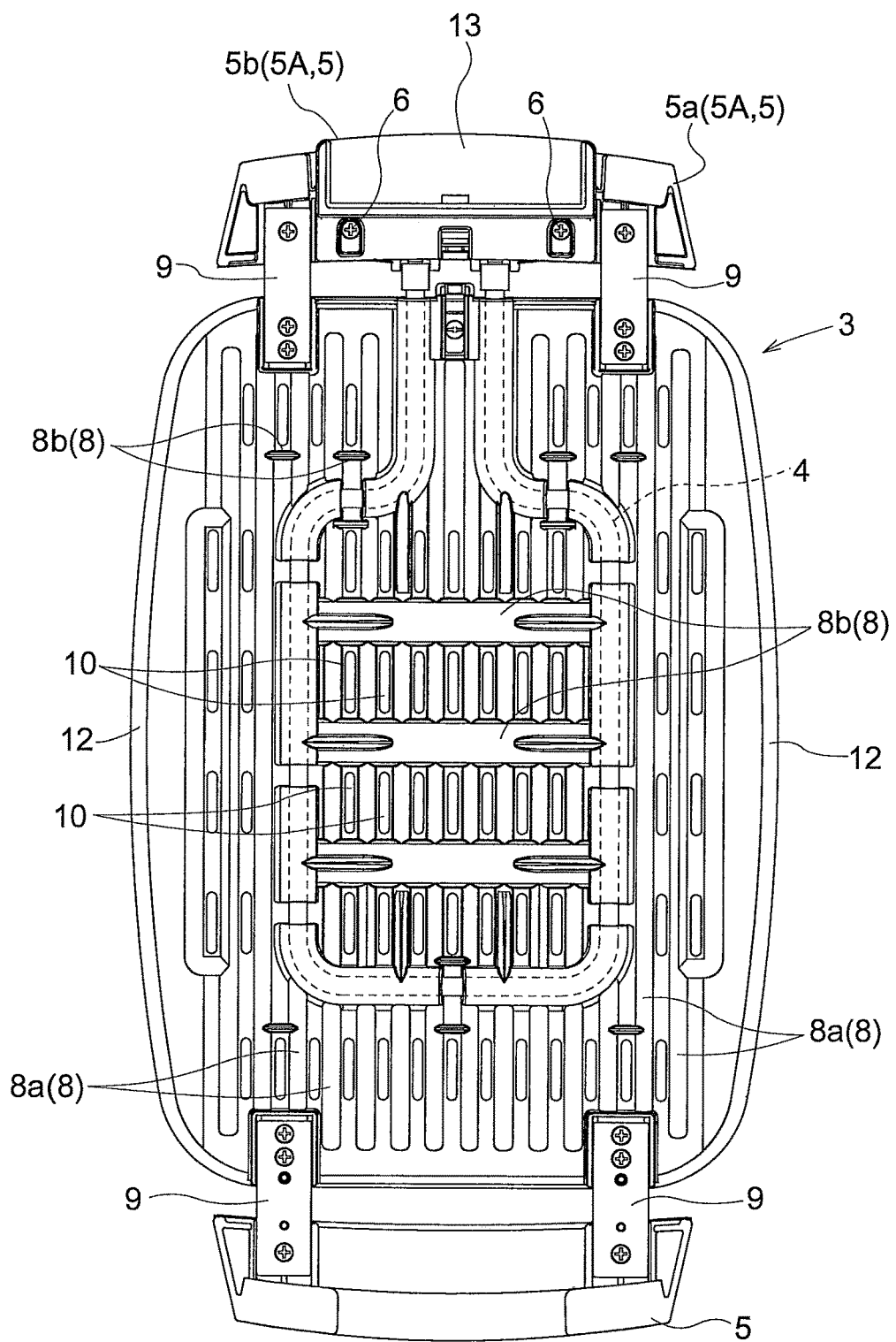
FIG. 4 is a rear surface view of the rear surface of a cooking plate.
Figure 5:
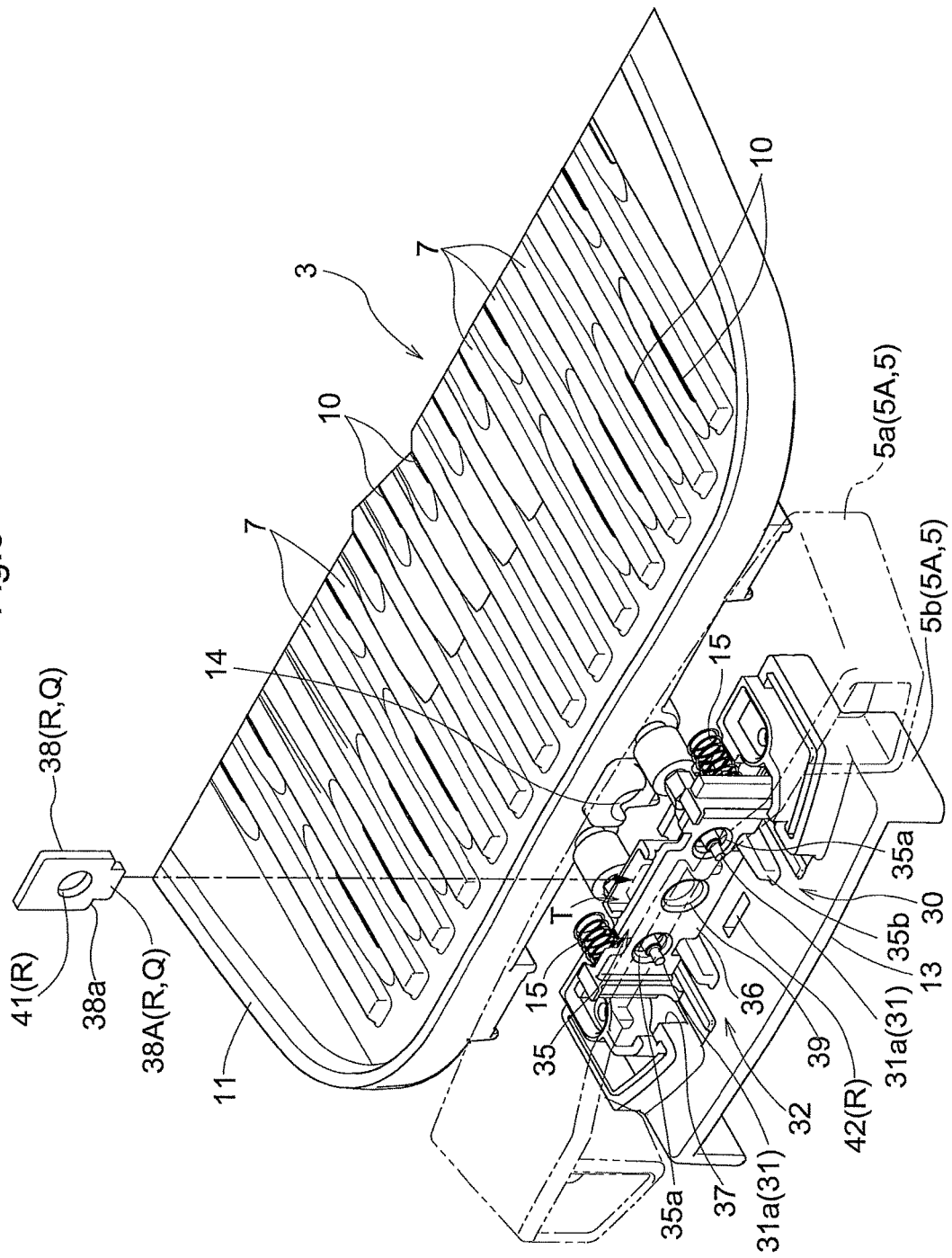
FIG. 5 is a schematic perspective view of the vicinity of a plug socket of a cooking plate when a power source plug has been inserted.

As shown in FIG. 4, the rear surface ridges 8 projecting downward from the rear surface of the cooking plate 3 are formed along the lengthwise direction of the cooking plate 3 at least at locations corresponding in the vertical direction to the front surface ridges 7, with a plurality of rows (16 in the present embodiment) of first rear surface ridges 8a being formed in parallel to one another with a plurality of through-holes 10 formed between adjacent ridges. In addition, a rear surface outer edge convexity 12 projecting downward from the rear surface is integrally formed around substantially the entire circumference of the outer edge of the rear surface of the cooking plate 3.

The rear surface ridges 8 projecting downward from the rear surface of the cooking plate 3 also comprise, apart from the first rear surface ridges 8a, second rear surface ridges 8b that at least connect adjacent first rear surface ridges 8a and are formed at locations intersecting the first rear surface ridges 8a. In the present embodiment, the angle of intersection of the first rear surface ridges 8a and the second rear surface ridges 8b is substantially 90°, but this angle of intersection can be altered as appropriate.

Figure 3:
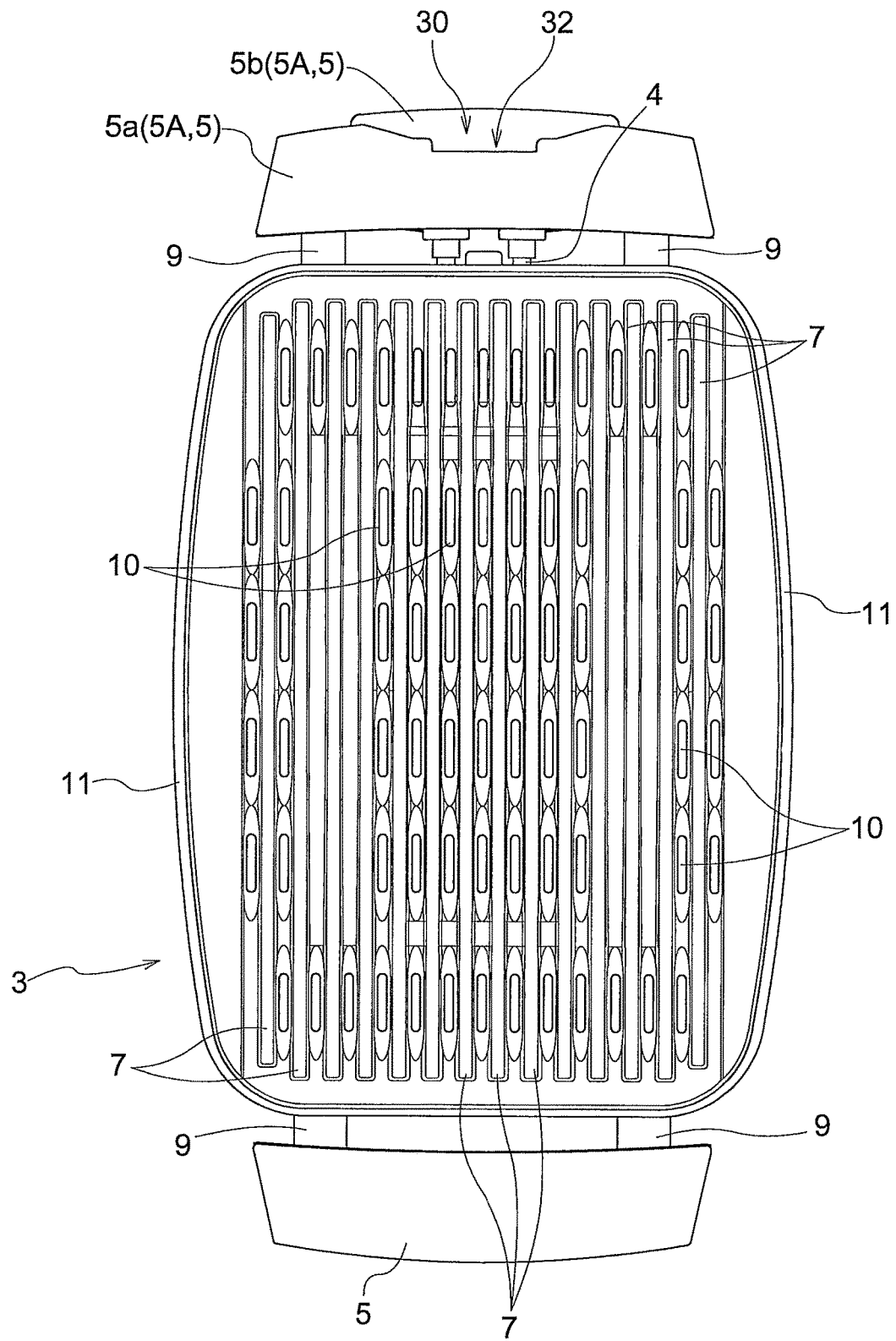
FIG. 3 is a top surface view of the front surface of a cooking plate.

As shown in FIGS. 3 and 4, a pair of handles 5 projecting outward via plate-shaped brackets 9 are attached to the cooking plate 3 at central positions (on the short ends) opposing each other in the lengthwise direction as seen in plan view. A pair of brackets 9 is provided for each of the handles 5, and is screwed in place through the lower surface of the handles 5 and the rear surface of the cooking plate 3 (see FIG. 4). As shown in FIGS. 1 and 2, the lower surface of the handles 5 is formed so that the central part thereof projects further downward than the two ends thereof, and, when the cooking plate 3 is rested on the main cooking device unit 1, the central part of the lower surface of the handles 5 and the central part of the upper surface of the handle holders 1C mate, and the respective two ends of the lower surface of the handles 5 and the two ends of the upper surface of the handle holders 1C mate, thereby positioning the handles 5 with respect to the handle holders 1C.

As shown in FIGS. 1, 2, 4, and 5, an approximate inverse U-shaped grips 13, the grip being horizontally elongated and downward opening as seen from the side, are formed at central positions on the lower surfaces of the pair of handles 5, configured so that the cooking plate 3 can be easily lifted by inserting fingers in a space between the grips 13 and the upper surfaces of the handle holders 1C and lifting the grips 13 upward.

As shown in FIG. 3 and FIG. 4, the electrothermal heater 4 is a single known electric sheathed heater that is curved into a flat, an approximate rectangular shape, and is integrally cast within the cooking plate 3 in parallel thereto and within the thickness thereof. As shown in FIGS. 3-9, the two ends of the electrothermal heater 4 (not shown) project into the plug socket 30, which is integrally formed with one handle 5A of the pair of handles 5 of the cooking plate 3, and electroconductive pins 31a (an example of socket-side electroconductive part 31) constituted by electroconductive members are electrically connected to the projecting parts of the heater via cylindrical glass members (not shown). The pair of electroconductive pins 31a are disposed projecting toward the horizontal opening 32 of the plug socket 30 when the tips thereof are positioned within the plug socket 30.

As shown in FIGS. 4-9, the one handle 5A is provided with an upper handle part 5a and a lower handle part 5b, both of which are fixed in place from below by screws 6. The grip 13 described above is formed integrally with the lower surface of the lower handle part 5b. As will be described in detail below, the box-shaped plug socket 30 provided with the horizontal rectangular opening 32 is disposed on the upper part of the grip 13 from the upper handle part 5a to the lower handle part 5b.

As shown in FIGS. 6-9, the plug socket 30 is provided with an insertion hole 33 in a central position between the pair of electroconductive pins 31a into which a heat-sensitive post 54 (example of an insertion guide) of the power source plug 50, described below, can be inserted. The cooking plate 3 is also provided with a heat-sensitive post insertion hole 14, concentric with the insertion hole 33, into which the heat-sensitive post 54 can be inserted at a position on the side where the plug socket 30 (i.e., the one handle 5A) is disposed (i.e., on the short side of the rectangle), the hole 14 being configured so that the heat-sensitive post 54 is inserted into the heat-sensitive post insertion hole 14, with the outer circumferential surface of the heat-sensitive post 54 in contact with the inner circumferential surface of the heat-sensitive post insertion hole 14, allowing the temperature of the cooking plate 3 to be detected. A tapered tip 54A decreasing in diameter towards the insertion tip is formed at the tip of the heat-sensitive post 54.

As shown in FIGS. 1, 2, and 6-9, the power source plug 50 is provided with a plug body 53 having a rough letter D shape as seen in plan view, the heat-sensitive post 54 projecting from an inserted part 53a providing on the insertion tip of the plug body 53, and a power source cord 55, disposed on the side opposite to the inserted part 53a, for connecting a power source and the plug body 53. The plug body 53 is provided with a temperature adjustment dial 52 allowing a user to adjust temperature and turn the power on or off, the dial being configured so as to perform control by adjusting the amount of electrical power supplied from the power source to the electrothermal heater 4 so that the temperature of the cooking plate 3 detected by the heat-sensitive post 54 becomes the temperature set using the temperature adjustment dial 52. In other words, the plug body 53 functions as a temperature adjuster device and power control device.

The inserted part 53a of the plug body 53 is formed in a rectangular shape substantially similar to and slightly smaller than that of the opening 32 of the plug socket 30 as seen from the side. Thus, the power source plug 50 is freely insertable into the plug socket 30 by inserting the inserted part 53a of the plug body 53 into the opening 32 while inserting the heat-sensitive post 54 into the insertion hole 33 of the plug socket 30, and the power source plug 50 is freely removable from the plug socket 30 in a similar manner. The insertion/removal direction in which the inserted part 53a is inserted into or removed from the opening 32 is identical to the direction in which the electroconductive pins 31a and the heat-sensitive post 54 project (i.e., the left-to-right direction in FIGS. 6A,6B,7A,7B,8A,8B,9A, and 9B).

The power source plug 50 is provided with a contacting surface 56 orthogonal to the insertion/removal direction. In other words, the surface on the side of the inserted part 53a of the plug body 53 from which the heat-sensitive post 54 projects is formed as a contacting surface 56 orthogonal to the insertion/removal direction. A pair of recessions 57 is formed on the contacting surface 56 at locations corresponding to the pair of electroconductive pins 31a, and power source terminals 51a (an example of a plug-side electroconductive part 51) constituted by electroconductive members are disposed within the recessions 57. The power source terminals 51a are biased toward the contacting surface 56, allowing for more reliable contact between the tips of the electroconductive pins 31a and the power source terminals 51a when the plug socket 30 and the power source plug 50 are joined (see FIG. 9). Each of the power source terminals 51a is connected to a power source cord 55 constituted by two power lines.

Thus, when the inserted part 53a of the power source plug 50 is inserted into the opening 32 of the plug socket 30, the tips of the electroconductive pins 31a intrude within the recessions 57 and are electrically connected to the power source terminals 51a.

As shown in FIG. 6 and FIG. 9, the plug socket 30 and the power source plug 50 are provided with a connection-maintaining mechanism M for keeping the socket-side electroconductive part 31 in a state of electrical connection with the plug-side electroconductive part 51 when the power source plug 50 is inserted into the plug socket 30.

Specifically, the connection-maintaining mechanism M is provided with swinging members 58 that are disposed on the two side surfaces of the power source plug 50 (i.e., the two side surfaces of the power source plug 50 in the insertion/removal direction as seen in plan view) and freely swingable with respect to the power source plug 50. The swinging members 58 are axially supported (not shown) by the power source plug 50 on a rear side (i.e., the rear side of the swinging members 58) oppose to that where the inserted part 53a is formed. Engaging claws 58a projecting outward from the side surface of the power source plug 50 are formed on the side of the swinging members 58 near the inserted part 53a (i.e., the front end of the swinging members 58), the engaging claws 58a being biased outward to the side by springs 59.

The connection-maintaining mechanism M is provided with engaging recessions 34 formed as cutouts on the two sides of the opening 32 of the plug socket 30 (i.e., the two sides in a direction orthogonal to the insertion/removal direction of the power source plug 50 as seen in plan view).

The engaging claws 58a thereby contact the inner surface of the opening 32 as the power source plug 50 is inserted into the plug socket 30, the engaging claws 58a are moved inward to the side against the biasing force of the springs 59, and the engaging claws 58a are then moved toward the engaging recessions 34 (i.e., outward to the side) by the biasing force of the springs 59 and engage with the engaging recessions 34 (see. FIG. 9). When the power source plug 50 is inserted into the plug socket 30, the engaging claws 58a are kept in a state of engagement with the engaging recessions 34 by the biasing force of the springs 59, allowing the tips of the electroconductive pins 31a to be kept in a state of electrical connection with the power source terminals 51a, in which state the power source plug 50 does not come out of the plug socket 30. A user can easily remove the power source plug 50 from the plug socket 30 by moving the power source plug 50 in a removal direction while pressing the engaging claws 58a inward to the side.

As shown in FIGS. 5-9, a protective plate 35 (an example of a protective member) for closing the opening 32 of the plug socket 30 and positioning the electroconductive pins 31a projecting into the plug socket 30 within an interior space S (closed space) is provided in the plug socket 30. The protective plate 35 is disposed so as to be slidable in a sliding direction identical to the direction in which the power source plug 50 is inserted into and removed from the plug socket 30 (i.e., the left-to-right direction in FIGS. 6A,6B,7A,7B,8A, 8B,9A, and 9B).

The protective plate 35 has a rectangular shape similar to and slightly smaller than that the rectangular opening 32, is formed in a direction orthogonal to the sliding direction (i.e., the left-to-right direction in FIGS. 6C,7C,8C, and 9C), and is provided with a contacted surface 36 parallel to the contacting surface 56 of the power source plug 50. A pair of pin insertion holes 35a into which the electroconductive pins 31a can be inserted is formed in the protective plate 35 at positions corresponding to the tips of the pair of electroconductive pins 31a projecting from the plug socket 30 toward the opening 32.

As shown in FIGS. 6-9, a pair of lower part cutouts 35b is formed in the lower parts of the pair of pin insertion holes 35a in the protective plate 35, the pair of lower part cutouts 35b freely sliding in the sliding direction so as to mate with a pair of lower sliding guide rails 60a projecting upward from the lower inner surface of the plug socket 30 and extending in the sliding direction. Similarly, a pair of upper part cutouts 35c is formed in the upper parts of the pair of pin insertion holes 35a in the protective plate 35, the pair of upper part cutouts 35c freely sliding so as to mate with a pair of upper sliding guide rails (not shown) projecting downward from the upper inner surface of the plug socket 30 and extending in the sliding direction. The protective plate 35 is thereby capable of reliably sliding in the sliding direction guided by the upper sliding guide rails and the lower sliding guide rails 60a.

Retaining ridges 35d projecting in the insertional sliding direction (i.e., the direction approaching the electroconductive pins 31a) is formed sideways to the outside of the pair of pin insertion holes 35a on the protective plate 35 constituting the two ends of the direction orthogonal to the sliding direction. Biasing springs 15 (example of a biasing member) are inserted between the retaining ridges 35d and locations opposing the retaining ridges 35d in the sliding direction within the plug socket 30, the biasing force of which biases the protective plate 35 in the removal sliding direction (i.e., the direction moving away from the electroconductive pins 31a). Because the protective plate 35 is biased at the two ends thereof by the biasing force from the pair of biasing springs 15, the protected state, in which the electroconductive pins 31a is positioned within the interior space S, can be more stably maintained. Projecting restrictor parts 37 projecting towards the inside of the opening 32 of the plug socket 30 are also provided within the opening 32 at positions not obstructing the insertion of the inserted part 53a of the power source plug 50, and the protective plate 35 being biased by the biasing springs 15 is kept in a state of contact with the projecting restrictor parts 37 (see FIG. 6). Thus, as shown in FIG. 6, the protective plate 35 in its natural state is in contact with the projecting restrictor parts 37 due to the biasing force of the biasing springs 15, creating a protected state in which state the tips of the electroconductive pins 31a are positioned within the interior space S of the plug socket 30 closed off by the protective plate 35 without projecting outside of the protective plate 35.

The protected state is a state in which the electroconductive pins 31a is positioned within the interior space S of the plug socket 30 closed off by the protective plate 35 (i.e., a state in which the pins are not exposed to the exterior of the plug socket 30 and the protective plate 35), and, as long as the electroconductive pins 31a are positioned within the interior space S, it is acceptable for the protective plate 35 to be capable of moving toward or away from the electroconductive pins 31a within a predetermined range in the sliding direction, or for the protective plate 35 to be incapable of moving toward or away from the electroconductive pins 31a in the sliding direction.

The central part of the protective plate 35 in a direction orthogonal to the sliding direction, i.e., a part between a pair of adjacent pin insertion holes 35a is integrally formed as a two-plated structure comprising a first plate 35A and a second plate 35B in the sliding direction (thickness direction). A space T in which an obstructor plate 38 slidable in the vertical direction, as described below, can be disposed is provided between the adjacent parallel first plate 35A and second plate 35B (see FIGS. 5 and 6). Because the second plate 35B has an approximate inverse U shape elongated in the traverse direction as seen in plan view, the space T is not closed in the vertical direction, but is closed in the sliding direction by the first plate 35A and the second plate 35B, and blocked in the direction orthogonal to the sliding direction by the second plate 35B.

As shown in FIGS. 5-9, a first protective plate hole 39 into which the heat-sensitive post 54 can be inserted and penetrate in the sliding direction is formed on the first plate 35A, and a second protective plate hole 40 is similarly formed in the second plate 35B. The first plate 35A and the second plate 35B are positioned in the stated order away from the opening 32 of the plug socket 30. Whereas the second protective plate hole 40 is formed as a substantially perfect circle concentric with the insertion hole 33 formed in the plug socket 30 and the heat-sensitive post insertion hole 14 formed in the cooking plate 3, the first protective plate hole 39 is formed as an elongated hole. In other words, as shown in FIGS. 6C,7C,8C, and 9C, the upper part of the first protective plate hole 39 is formed as a substantially perfect circle similar to the second protective plate hole 40 (i.e., the upper half of a perfect circle), and the lower part thereof is formed as the lower half of an ellipse formed by elongating the lower half of the perfect circle of the second protective plate hole 40. Thus, while the upper inner circumferential surface (upper end) of the first protective plate hole 39 coincides with the upper inner circumferential surfaces (upper ends) of the second protective plate hole 40, the insertion hole 33, and the heat-sensitive post insertion hole 14 as seen in side view, the lower inner circumferential surface (lower end) of the first protective plate hole 39 is positioned at a position offset downward from the lower inner circumferential surfaces (lower ends) of the second protective plate hole 40, the insertion hole 33, and the heat-sensitive post insertion hole 14.

As shown in FIGS. 5-9, the obstructor plate 38 slidable within the space T in the vertical direction with respect to the protective plate 35 (i.e., the first plate 35A and the second plate 35B) is disposed within the space T, which is formed between the first plate 35A and the second plate 35B of the protective plate 35.

The obstructor plate 38 is formed as an approximate rectangular plate in a shape so as to be disposable within the space T in the protective plate 35. A protrusion 38A (example of the lower part of the obstructor plate 38) projecting downward from a lower end surface 38a of the obstructor plate 38 is formed on the lower part of the obstructor plate 38, the protrusion 38A being formed in a central position in the direction orthogonal to the sliding direction on the lower end surface 38a so as to be mateable with a mating hole 42 formed in the plug socket 30.

Figure 6B:
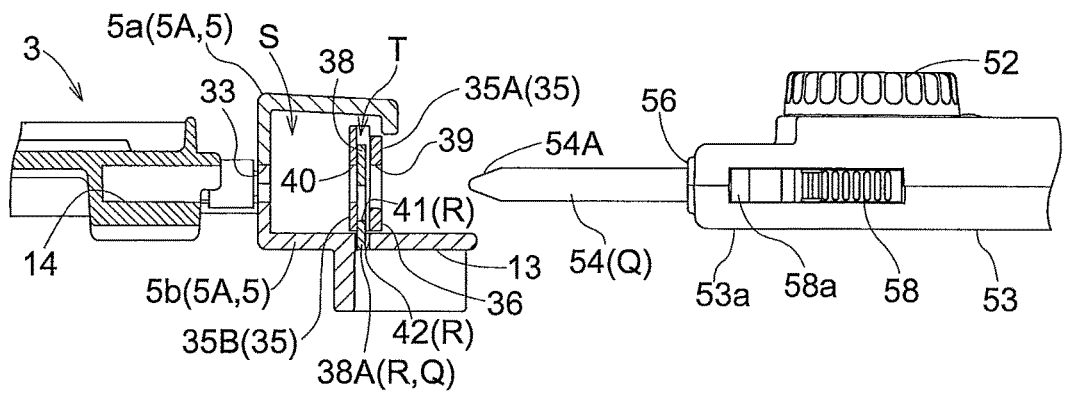
FIG. 6B is a partial magnified longitudinal-sectional view of the vicinity of the plug socket.

As shown in FIG. 6, the protective plate 35 is biased by biasing springs 15 toward the protected state (i.e., a state in which the electroconductive pins 31a are positioned in the interior space S closed by the protective plate 35). In this protected state, the mating hole 42 is formed as a cutout in the lower surface of the plug socket 30 constituting the lower part of the obstructor plate 38 provided on the protective plate 35 (i.e., in the upper surface of the lower handle part 5b) in a position such that the protrusion 38A of the obstructor plate 38 descending under its own weight is mateable therewith (see FIGS. 5,6B,7B,8B, and 9B). In the present embodiment, the mating hole 42 is formed as a cutout of comparable or slightly greater thickness than the protrusion 38A of the obstructor plate 38 in the sliding direction of the protective plate 35.

Thus, when the protective plate 35 is in the protected state, the obstructor plate 38 has descended under its own weight into the space T, the lower end surface 38a of the obstructor plate 38 contacts the upper surface of the lower handle part 5b, and the protrusion 38A has mated with the mating hole 42, the protective plate 35 is in the restricted movement state, in which it is restricted so as to be incapable of movement either toward or away from the electroconductive pins 31a in the sliding direction (i.e., the insertion/removal direction of the power source plug 50) (see FIG. 6). In other words, the obstructor plate 38, the protrusion 38A, and the mating hole 42 function as a movement-restricting mechanism R. In lieu of or in addition to this configuration in which the obstructor plate 38 descends into the space T under its own weight, it is also possible to adopt a configuration in which the obstructor plate 38 is forced to descend and the protrusion 38A to mate with the mating hole 42, or a configuration in which the mated state of the protrusion 38A with the mating hole 42 is forcibly maintained.

The obstructor plate 38 is provided with an obstructor plate hole 41 in a central position in the vertical direction and the direction orthogonal to the sliding direction of the power source plug 50 into which the heat-sensitive post 54 can be inserted and penetrate in the sliding direction. The obstructor plate hole 41 is formed as a substantially perfect circle.

Figure 6C:
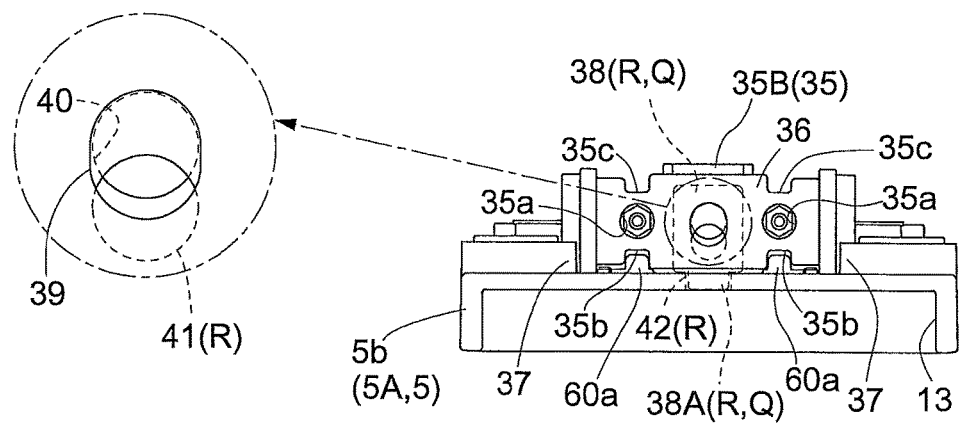
FIG. 6C is a side surface view of the vicinity of the plug socket.
Figure 7A:
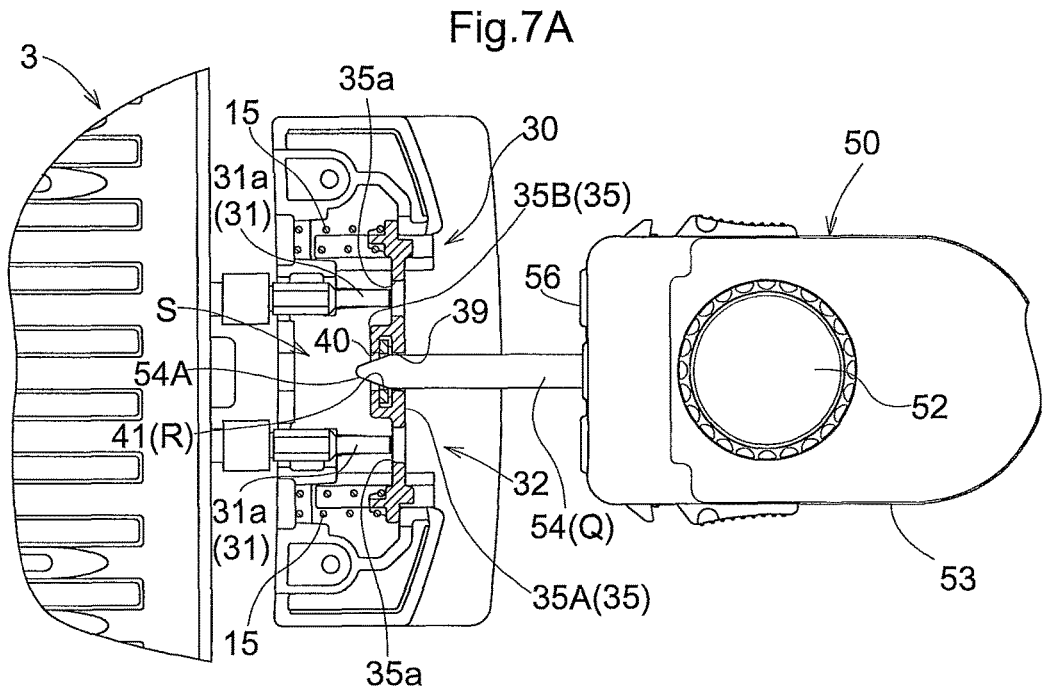
FIG. 7A is a partial magnified cross-sectional view of the vicinity of a plug socket in which a heat-sensitive post of a power source plug is beginning to raise an obstructor plate.
Figure 7B:
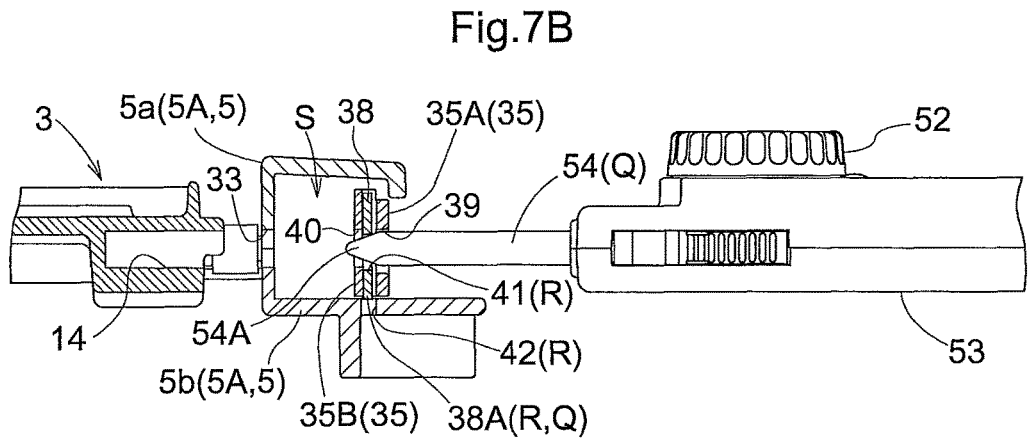
FIG. 7B is a partial magnified longitudinal-sectional view of the vicinity of the plug socket.
Figure 7C:
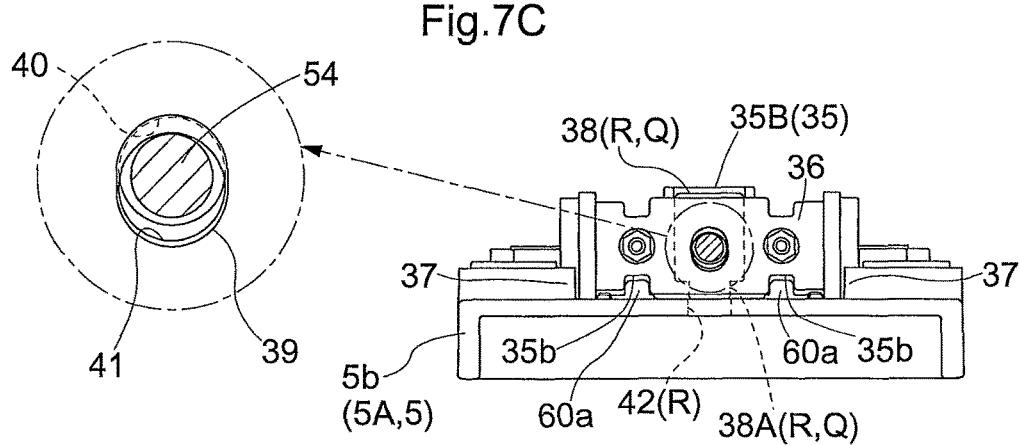
FIG. 7C is a side surface view of the vicinity of the plug socket.
Figure 8A:
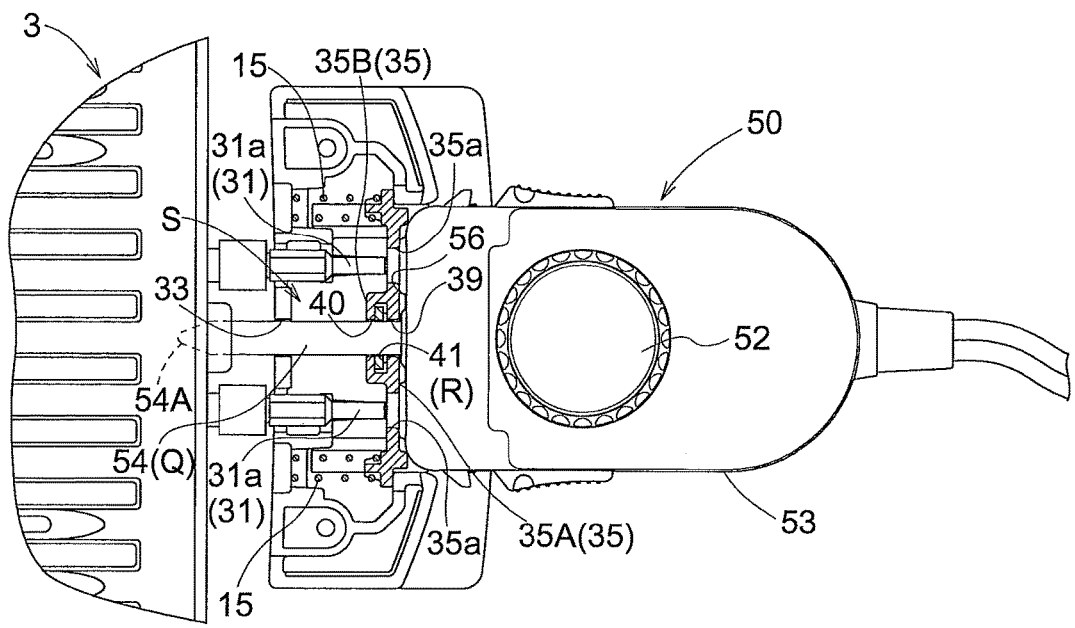
FIG. 8A is a partial magnified cross-sectional view of the vicinity of a plug socket in which a contacting surface of a power source plug is in contact with a contacted surface of a protective plate.
Figure 8B:
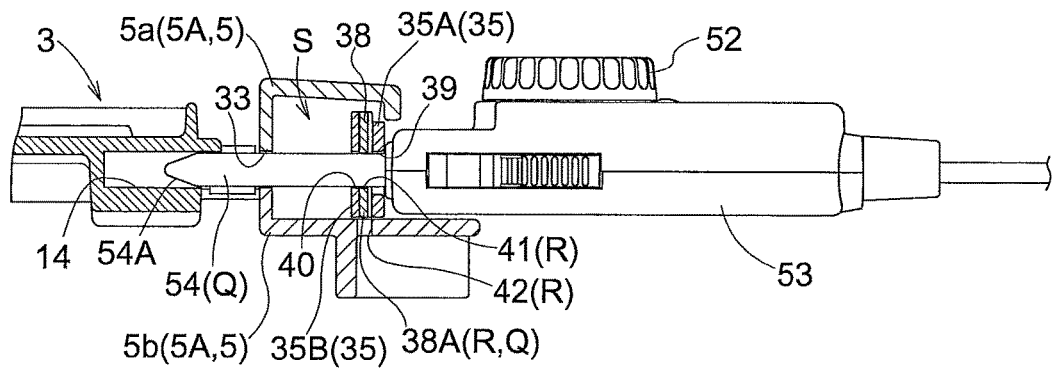
FIG. 8B is a partial magnified longitudinal-sectional view of the vicinity of the plug socket.
Figure 8C:
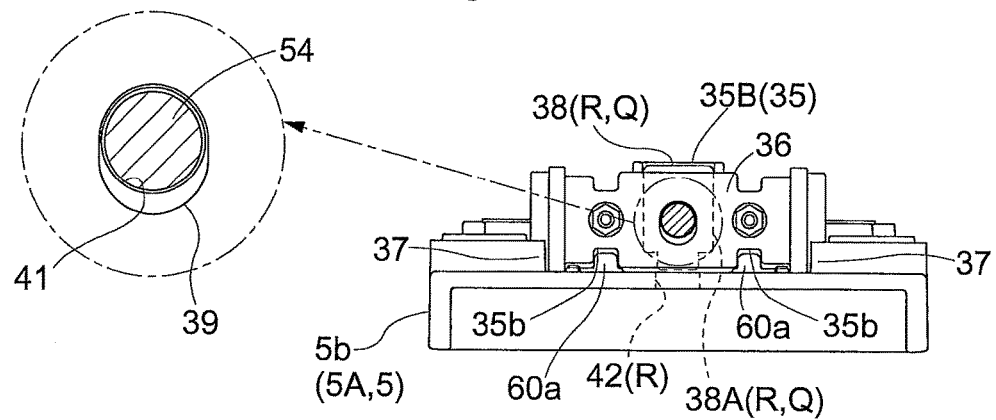
FIG. 8C is a side surface view of the vicinity of the plug socket.

Thus, as shown in FIG. 6, when in the restricted movement state in which the movement of the protective plate 35 in the sliding direction is restricted by the movement-restricting mechanism R, i.e., a state in which the protrusion 38A of the obstructor plate 38 is mated to the mating hole 42, the upper inner circumferential surfaces (upper ends) of the first protective plate hole 39, the second protective plate hole 40, the insertion hole 33, and the heat-sensitive post insertion hole 14 align, but the upper inner circumferential surface (upper end) of the obstructor plate hole 41 is offset downward with respect to the upper inner circumferential surfaces (upper ends) of these holes. In addition, while the lower inner circumferential surfaces (lower ends) of the second protective plate hole 40, the insertion hole 33, and the heat-sensitive post insertion hole 14 align, the lower inner circumferential surface (lower end) of the obstructor plate hole 41 is offset downward with respect to the lower inner circumferential surfaces (lower ends) of these holes. Because the lower part of the first protective plate hole 39 is elliptical in shape, the lower inner circumferential surface (lower end) of the first protective plate hole 39 is positioned between the lower inner circumferential surface (lower end) of the second protective plate hole 40 and the lower inner circumferential surface (lower end) of the obstructor plate hole 41 (see FIG. 6C). Thus, the first protective plate hole 39 and the obstructor plate hole 42 form an overlapping part in side view. In other words, the overlapping part forms a comparatively large connected area into which the heat-sensitive post 54 is insertable.

Meanwhile, as shown in FIGS. 8 and 9, when the protective plate 35 has been switched by a switching mechanism Q from the restricted movement state effected by the movement-restricting mechanism R to the released-restriction state; i.e., when the heat-sensitive post 54 of the power source plug 50 has been inserted in order through the first protective plate hole 39, the overlapping part formed by the first protective plate hole 39 and the obstructor plate hole 41, the obstructor plate hole 41, the second protective plate hole 40, the insertion hole 33, and the heat-sensitive post insertion hole 14; and the inserted part 53a of the power source plug 50 is inserted into the opening 32 of the plug socket 30, the obstructor plate 38 is raised up with respect to the protective plate 35 by the heat-sensitive post 54, and the upper inner circumferential surfaces (upper ends) of the first protective plate hole 39, the obstructor plate hole 41, the second protective plate hole 40, the insertion hole 33, and the heat-sensitive post insertion hole 14 are aligned. As the obstructor plate 38 moves upward, the protrusion 38A of the obstructor plate 38 is also raised and removed entirely from the mating hole 42, and the protective plate 35 switches from the restricted movement state, in which the movement of the plate in the sliding direction thereof (i.e., the insertion/removal direction of the power source plug 50) both toward and away from the electroconductive pins 31a is restricted, to the released-restriction state, in which this restriction is released. In other words, the obstructor plate 38, the protrusion 38A, and the heat-sensitive post 54 function as a switching mechanism Q.

Next, the action of connecting and disconnecting the power source plug 50 and the plug socket 30 of the hotplate H having the configuration described above will be described with reference to FIGS. 1, 2, and 5-9, with primary emphasis upon the action of the movement-restricting mechanism R and the switching mechanism Q.

First, as shown in FIGS. 1 and 2, after the water dish 2 has been rested in the main cooking device unit 1 and filled with a predetermined amount of water, the pair of handles 5 attached to the cooking plate 3 is rested and held in the pair of handle holders 1C in the main cooking device unit 1, and the water dish 2 and the cooking plate 3 are integrated with the main cooking device unit 1.

In this state, as shown in FIG. 6, the protective plate 35 for closing off the opening 32 of the plug socket 30 is biased by the biasing force of the biasing springs 15 into the protected state, and the protrusion 38A of the obstructor plate 38 disposed on the protective plate 35 descends under its own weight and mates with the mating hole 42, entering the restricted movement state. In other words, the protective plate 35 is in the protected state in which the electroconductive pins 31a is positioned within the interior space S, and is reliably restrict so as to be incapable of movement toward or away from the electroconductive pins 31a. Thus, when grasping the grips 13 provided on the handles 5 (especially the one handle 5A) and resting the cooking plate 3 on the main cooking device unit 1 or performing other actions when the power source plug 50 is not inserted into the plug socket 30, the electroconductive pins 31a can be reliably kept positioned within the interior space S (closed space) closed off by the protective plate 35 (i.e., in the protected state), and the electroconductive pins 31a are not exposed to the exterior of the interior space S, even if some force in a direction moving toward or away from the electroconductive pins 31a in the sliding direction works upon the protective plate 35. It is thus possible to reliably prevent contact by a user's hand with the electroconductive pins 31a, the adherence of dirt or the like thereto, and collisions by objects therewith.

Next, as shown in FIG. 7, when inserting the power source plug 50 into the plug socket 30, the inserted part 53a of the power source plug 50 is moved toward the opening 32 of the plug socket 30 with the heat-sensitive post 54 of the power source plug 50 aligned with the insertion/removal direction of the power source plug 50 (i.e., the sliding direction of the protective plate 35).

In other words, the power source plug 50 is successively moved along the insertion/removal direction in the insertion direction as the tapered tip 54A of the heat-sensitive post 54 is inserted into the part where the first protective plate hole 39 and the obstructor plate hole 41 overlap.

When the tapered tip 54A of the heat-sensitive post 54 is thereby inserted into the overlapping part formed by the first protective plate hole 39 and the obstructor plate hole 41, it is possible to successively and smoothly raise the upper inner circumferential surface of the obstructor plate hole 41 upward along the tapered tip 54A and the outer circumferential surface (upper part) of the heat-sensitive post 54, which expands to a greater diameter than the tapered tip 54A toward the rear end thereof when the heat-sensitive post 54 passes through the obstructor plate hole 41 offset downward from the first protective plate hole 39. The rising action of the obstructor plate 38 continues until the upper inner circumferential surface of the obstructor plate hole 41 reaches substantially the same height as the upper inner circumferential surfaces of the first protective plate hole 39, the second protective plate hole 40, the insertion hole 33, and the heat-sensitive post insertion hole 14, and the protrusion 38A of the obstructor plate 38 is removed from the mating hole 42. The insertion of the heat-sensitive post 54 into the obstructor plate hole 41 keeps the protrusion 38A of the obstructor plate 38 in an unmated state within the mating hole 42 (i.e., the obstructor plate 38 does not descend under its own weight). The heat-sensitive post 54 thus moves the obstructor plate 38 upward relative to the protective plate 35 as the power source plug 50 is inserted into the plug socket 30, allowing for easy switching from the restricted movement state, in which the movement of the protective plate 35 is restricted by the obstructor plate 38, to the released-restriction state.

Additionally, when the heat-sensitive post 54 of the power source plug 50 is inserted into the part where the protective plate hole 39 and the obstructor plate hole 41 overlap, the cross-sectional area of the heat-sensitive post 54 inserted into the overlapping part can be reduced compared to cases in which a tapered tip 54A is not formed, allowing for easier and more reliable insertion even if the area of the overlapping part is comparatively small.

Next, as shown in FIG. 8, the inserted part 53a of the power source plug 50 is moved further toward the opening 32 of the plug socket 30, and the contacting surface 56 of the inserted part 53a of the power source plug 50 is brought into contact with the contacted surface 36 of the protective plate 35.

Then, as shown in FIG. 9, the contacted surface 36 is pressed by the contacting surface 56 against the biasing force of the biasing springs 15, and the protective plate 35 is moved in the sliding direction until the engaging claws 58a of the swinging members 58 disposed on both side surfaces of the power source plug 50 engage with the engaging recessions 34 formed as cutouts on both sides of the opening 32 of the plug socket 30. With the engaging claws 58a and the engaging recessions 34 engaged, the tips of the electro conductive pins 31a project through the pin insertion holes 35a to the exterior of the protective plate 35 (i.e., outside the interior space S), and are inserted into the recessions 57 formed in the contacting surface 56 of the inserted part 53a. The tips of the electro conductive pins 31a inserted in the recessions 57 are electrically connected to the power source terminals 51a disposed in the recessions 57.

Furthermore, because the switching mechanism Q switches from a restricted movement state in which the movement of the protective plate 35 is restricted by the movement-restricting mechanism R to a released-restriction state in which restriction by the movement-restricting mechanism R is released as the power source plug 50 is inserted into the plug socket 30, there is no need for an act or configuration for the movement-restricting mechanism R to switch the restricted movement state to the released-restriction state apart from the act of inserting the power source plug 50, allowing for a simple switching mechanism Q configuration. In other words, when the heat-sensitive post 54 of the power source plug 50 is inserted into the first protective plate hole 39 and the obstructor plate hole 41 (i.e., when the power source plug 50 is inserted into the plug socket 30), the heat-sensitive post 54 is inserted into the overlapping part formed by the first protective plate hole 39 and the obstructor plate hole 41; and, when the heat-sensitive post 54 passes through the obstructor plate hole 41 offset downward with respect to the first protective plate hole 39, the upper part of the outer circumferential surface of the heat-sensitive post 54 comes into contact with the upper inner circumferential surface of the obstructor plate hole 41, and the obstructor plate 38 successively rises until the upper inner circumferential surface of the obstructor plate hole 41 reaches substantially the same height as the upper inner circumferential surface of the first protective plate hole 39, removing the protrusion 38A of the obstructor plate 38 from the mating hole 42. The heat-sensitive post 54 thus moves the obstructor plate 38 upward relative to the protective plate 35 as the power source plug 50 is inserted into the plug socket 30, allowing for easy switching from the restricted movement state, in which the movement of the protective plate 35 is restricted by the obstructor plate 38, to the released-restriction state.

The act of inserting the power source plug 50 into the plug socket 30 is thus utilized to allow the protective plate 35 to be simply and easily switched from the restricted movement state to the released-restriction state without the need for a separate action.

Finally, to remove the power source plug 50 from the plug socket 30, with the front ends of the swinging members 58 disposed on both ends of the power source plug 50 (i.e., the engaging claws 58a) pressed inward against the biasing force of the springs 59, the power source plug 50 is moved along the insertion/removal direction in the removal direction, removing the inserted part 53a from the opening 32, and the heat-sensitive post 54 is removed from within the heat-sensitive post insertion hole 14, the insertion hole 33, the second protective plate hole 40, the obstructor plate hole 41, and the first protective plate hole 39 (changing in order from the state shown in FIG. 9 to those shown in FIG. 8, FIG. 7, and FIG. 6).

The pressure by the contacting surface 56 of the power source plug 50 against the contacted surface 36 of the protective plate 35 is thereby released, as shown in FIG. 6, and the protective plate 35 is returned by the biasing force of the biasing springs 15 to the protected state in which the electroconductive pins 31a are positioned within the interior space S closed off by the protective plate 35. When the heat-sensitive post 54 is removed from the obstructor plate hole 41 of the obstructor plate 38 when the protective plate 35 is in the protected state, the obstructor plate 38 descends under its own weight into the space T, and the protrusion 38A formed on the lower part of the obstructor plate 38 is again mated with the mating hole 42 formed as a cutout in the upper surface of the lower handle part 5b.

The protective plate 35, which had been in the restriction released state, is thereby returned to the protected state, in which the electroconductive pins 31 are positioned within the interior space S closed off by the protective plate 35, simply by the removal of the power source plug 50 from the plug socket 30, and the protective plate 35 (obstructor plate 38) can simply and reliably switched to the restricted movement state.

It is thereby possible, in the hotplate H according to the present embodiment, to reliably prevent accidental contact by a user's hand with the electroconductive pins 31a disposed in the plug socket 30 and adherence of dirt or the like thereto using a simple configuration, allowing for reliable insertion of the power source plug 50 into the plug socket 30.

Other embodiments of the present invention will be described below. The features of the various embodiments described below are not limited to being used in isolation, and can be applied in combination with features from other embodiments to the extent that they do not contradict each other.

ALTERNATIVE EMBODIMENTS (1) In the embodiment described above, configured so that the protrusion 38A formed in the lower part of the obstructor plate 38 as a movement-restricting mechanism R mates with the mating hole 42 formed as a cutout in the upper surface of the lower handle part 5b, the thickness of the mating hole 42 in the insertion/removal direction of the power source plug 50 (i.e., the sliding direction of the protective plate 35) is comparable to or slightly greater than the thickness of the protrusion 38A, and the protrusion 38A (and, by extension, the protective plate 35) is incapable of moving toward or away from the electroconductive pins 31a in the sliding direction.

Figure 10A:
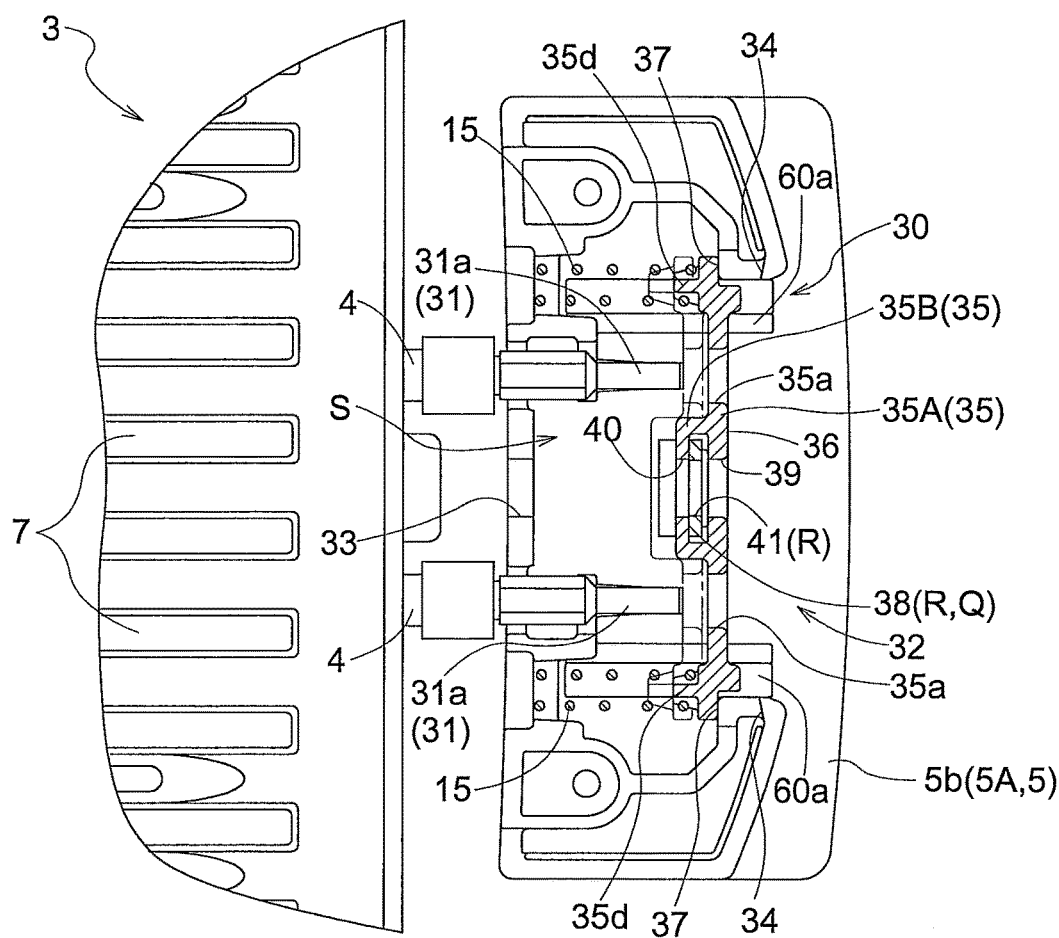
FIG. 10A is a schematic illustration of the configuration of a mating hole according to an alternative embodiment (1)
Figure 10B:
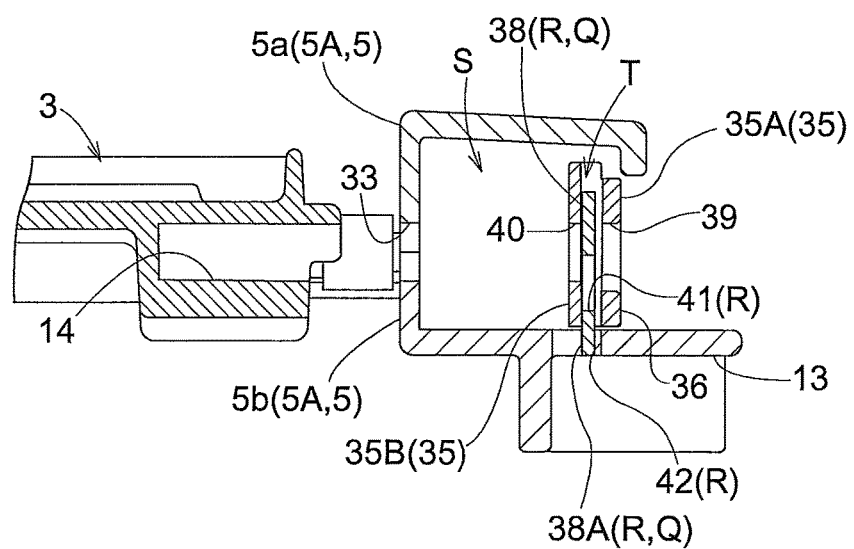
FIG. 10B is a schematic illustration of the configuration of a mating hole according to an alternative embodiment (1)

However, a configuration in which the protective plate 35 is capable of movement toward or away from the electroconductive pins 31a within a predetermined range is also acceptable as long as it is within a range such that the electroconductive pins 31a constituting the socket-side electroconductive part 31 can be kept within the protected state in which they are protected by the protective plate 35 acting as the protective member; i.e., such that the protected state in which the protective plate 35 positions the electroconductive pins 31a within the interior space S formed by closing the opening 32 by the protective plate 35, when the protrusion 38A is mated with the mating hole 42. For example, as shown in FIGS. 10A, and 10B, the thickness of the mating hole 42 in the insertion/removal direction of the power source plug 50 (i.e., the sliding direction of the protective plate 35) may be increased within a predetermined range over the thickness of the protrusion 38A of the obstructor plate 38 (in FIGS. 10A, and 10B, the thickness of the mating hole 42 is substantially three to four times that of the protrusion 38A, and the protective plate 35 is configured so as to be slidable between the solid lines and the imaginary lines while maintaining the protected state). Though not shown in the drawing, it is also possible, for example, for the thickness of the protrusion 38A to be less than that of the mating hole 42 within a predetermined range.

(2) In the description of the embodiment above, the heat-sensitive post 54 projecting from the contacting surface 56 of the power source plug 50 is used as the insertion guide of the switching mechanism Q; but another configuration is also acceptable as long as the switch from the restricted movement state effected by the obstructor plate 38 provided on the protective plate 35 to the released-restriction state as the power source plug 50 is inserted into the plug socket 30.

For example, a projecting guide (not shown) projecting from the contacting surface 56 of the power source plug 50 may be used in lieu of or separately from the heat-sensitive post 54 of the power source plug 50 as the insertion guide of the switching mechanism Q. The projecting guide is configured so that, on being inserted into the obstructor plate hole 41 formed in the obstructor plate 38, the obstructor plate 38 is moved upward, allowing the obstructor plate 38 to be removed from the mating hole 42.

(3) In the embodiment described above, an example in which the movement-restricting mechanism R is provided with an obstructor plate 38, a protrusion 38A, and a mating hole 42, and the switching mechanism Q is provided with a obstructor plate 38, a protrusion 38A, and a heat-sensitive post 54 is given. However, a configuration for the movement-restricting mechanism R other than that described above may also be used as long as movement of the protective member both toward and away from the socket-side electroconductive part 31 can be restricted in the protected state in which the socket-side electroconductive part 31 is positioned within the interior space S closed off by the protective member. In addition, a configuration for the switching mechanism Q other than that described above may also be used as long as it is possible to switch from the restricted movement state of the protective member effected by the movement-restricting mechanism R to the released-restriction state, in which restriction by the movement-restricting mechanism R is released, as the power source plug 50 is inserted into the plug socket 30.

(3-1) For example, the protrusion 38A formed on the lower part (i.e., the non-open part) of the obstructor plate 38 as a movement-restricting mechanism R may be omitted, and the entirety of the lower part of the obstructor plate 38 mated with the mating hole 42.

Figure 11A:
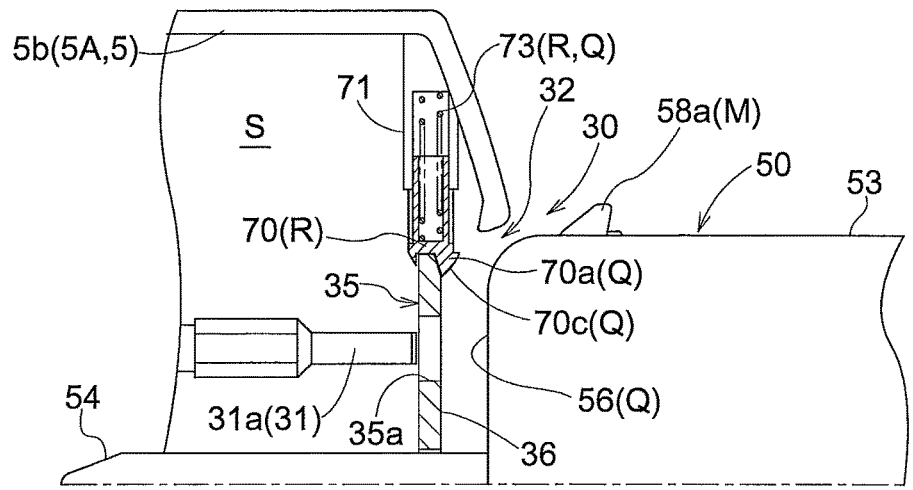
FIG. 11A is a partial magnified cross-sectional view of the vicinity of a plug socket showing the rough configurations of a movement-restricting mechanism and a switching mechanism according to an alternative embodiment (3-2)
Figure 11B:
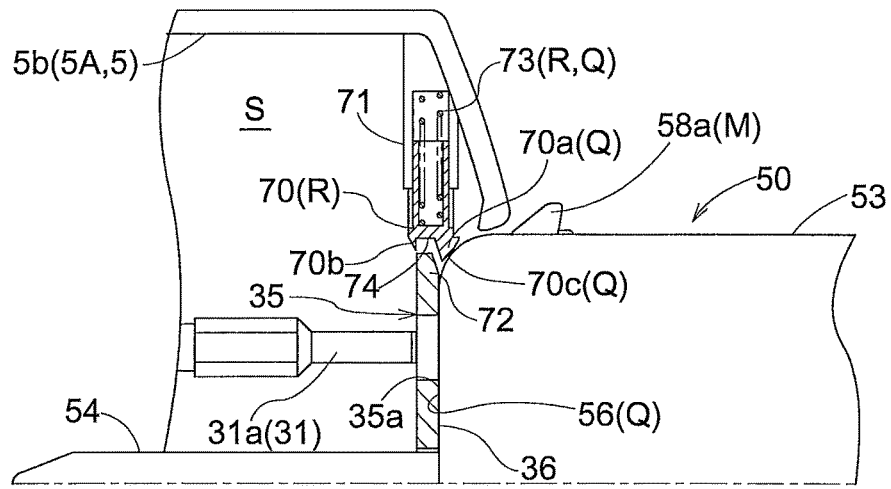
FIG. 11B is a partial magnified cross-sectional view of the vicinity of a plug socket showing the rough configurations of a movement-restricting mechanism and a switching mechanism according to an alternative embodiment (3-2)
Figure 11C:
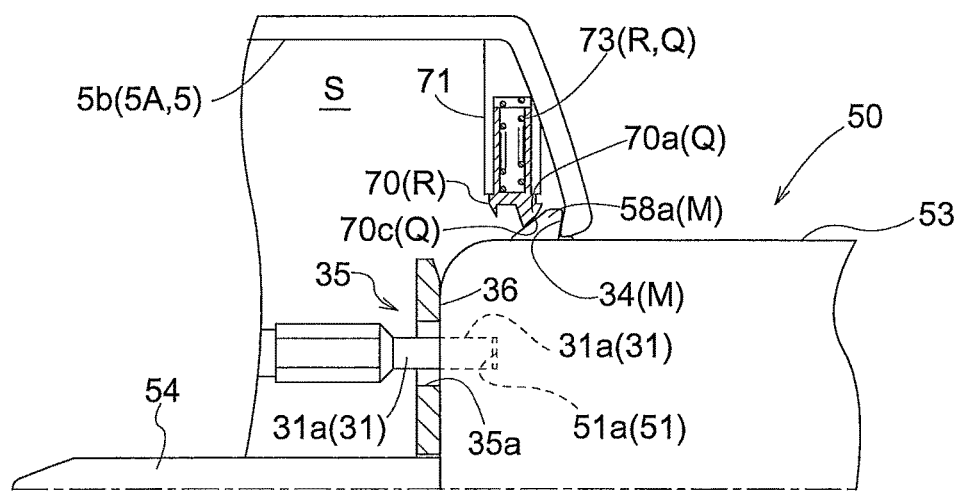
FIG. 11C is a partial magnified cross-sectional view of the vicinity of a plug socket showing the rough configurations of a movement-restricting mechanism and a switching mechanism according to an alternative embodiment (3-2)

(3-2) The configurations shown, for example, in FIGS. 11A,11B, and 11C, may be used for the movement-restricting mechanism R and the switching mechanism Q.

Specifically, it is possible, as shown in FIGS. 11A,11B, and 11C, to provide a movement restriction member 70 having a rough letter-U shape as seen in plan view within the opening 32 of the plug socket 30 at two ends 71 of the protective plate 35 acting as a protective member in a direction orthogonal to the sliding direction, and a pair of pressing springs 73 for biasing the movement restriction member 70 from the ends 71 within the opening 32 toward ends 72 of the protective plate 35. The movement restriction member 70 is provided with a pair of protrusions 70a, 70b, and the ends 72 of the protective plate 35 are mated with a mating part 74 formed as a recession between the pair of protrusions 70a, 70b. The protective plate-side surfaces of the protrusions 70a, 70b contact the surfaces on both sides of the protective plate 35 in the sliding direction, and restrict movement of the protective plate 35 in the sliding direction, i.e., movement of the protective plate 35 both toward and away from the electroconductive pins 31a while in the protected state in which the electroconductive pins 31a are positioned in the interior space S closed off by the protective plate 35. The movement restriction member 70 and the pressing springs 73 thus function as a movement-restricting mechanism R.

In addition, a surface of the protrusion 70a on a side opposite to the protective plate in the sliding direction is formed as a tapered surface 70c, and, whereas the protective plate-side surface is substantially parallel with the contacted surface 36 of the protective plate 35, the tapered surface 70c is a curved surface in which the protrusion 70a grows gradually thinner from the ends 71 toward the ends 72 of the protective plate 35 in a direction orthogonal to the sliding direction. Thus, when the power source plug 50 is inserted into the opening 32 of the plug socket 30 in the restricted movement state in which the movement of the protective plate 35 in the sliding direction is restricted by the movement restriction member 70 of the movement-restricting mechanism R (see FIG. 11A), the contacting surface 56 of the power source plug 50 contacts the tapered surface 70c, and the power source plug 50 moves against the biasing force of the pressing springs 73 in a direction orthogonal to the sliding direction toward a side opposite the protective plate 35 (i.e., away therefrom) as insertion proceeds, switching the restricted movement state of the protective plate 35 effected by the movement restriction member 70 to the released-restriction state (see FIG. 11B). Then, with the contacting surface 56 of the power source plug 50 in contact with the contacted surface 36 of the protective plate 35, the protective plate 35 slides in the sliding direction, and the power source plug 50 is inserted into the plug socket 30 (see FIG. 11C). The protrusion 70a, the tapered surface 70c of the protrusion 70a, the contacting surface 56 of the power source plug 50, and the pressing springs 73 thus function as a switching mechanism Q.

(4) In the embodiment described above, the protective plate 35 acting as a protective member is a plate member having a rectangular shape similar to and slightly smaller than that of the rectangular opening 32, and integrally formed as a rectangle orthogonal to the sliding direction. Then, as the power source plug 50 is inserted into the opening 32 of the plug socket 30, the protective plate 35 present between the plug socket 30 and the power source plug 50 is made to slide in the sliding direction along with the power source plug 50 until the power source plug 50 is completely inserted into the plug socket 30, i.e., until the electroconductive pins 31a constituting the socket-side electroconductive part 31 and the power source terminals 51a constituting the plug-side electroconductive part 51 are electrically connected.

However, another configuration may be adopted for the protective member as long as the protective member, which positions the socket-side electroconductive part 31 within the interior space S, does not impede the insertion of the power source plug 50 into the plug socket 30.

Figure 12:
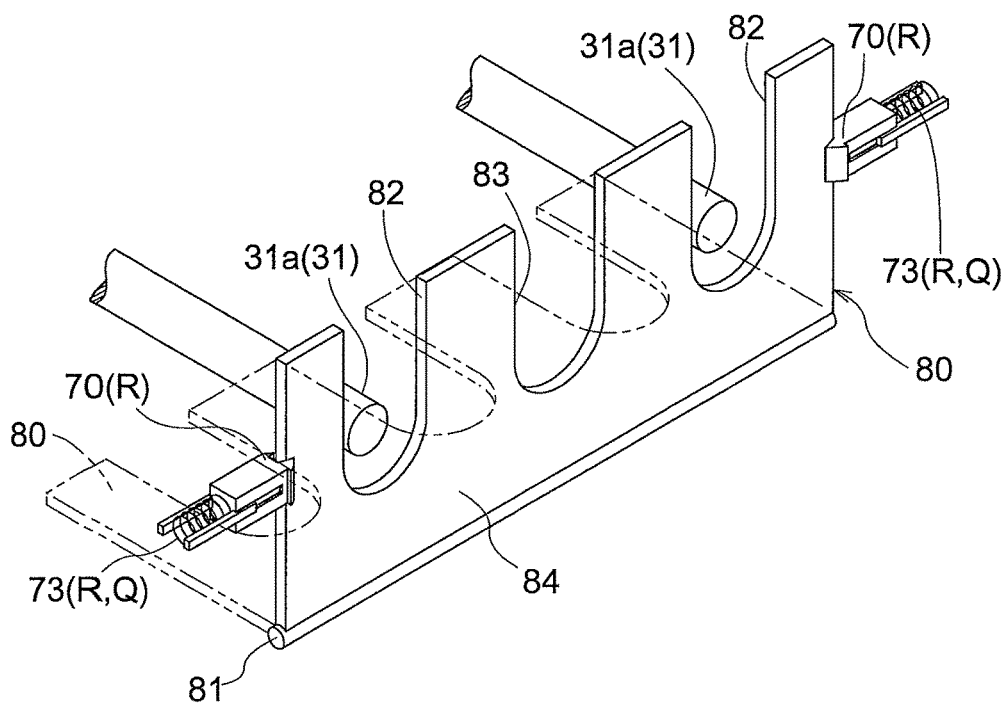
FIG. 12 is a schematic perspective view of the vicinity of a plug socket showing the rough configurations of a protective member, a movement-restricting mechanism, and a switching mechanism according to an alternative embodiment (4-1)

(4-1) The configuration shown, for example, in FIG. 12 may be used for the protective member.

As shown in FIG. 12, it is possible for the protective member for blocking the opening 32 of the plug socket 30 to be a rectangular plate member 80 having a shape similar to and slightly smaller than the rectangular opening 32, and for a hinge shaft 81 following the lengthwise direction of the plate member 80 orthogonal to the insertion/removal direction of the power source plug 50 to be provided beneath the plate member 80. In this case, pin insertion holes 82 are formed at locations corresponding to the electroconductive pins 31a acting as the socket-side electroconductive part 31 so as not to block the plate member 80 when the plate member 80 is swung around the hinge shaft 81, the pin insertion holes 82 be formed as cutouts with open upper ends. An insertion hole 83 for the heat-sensitive post 54 (not shown) is formed at a location corresponding to the heat-sensitive post 54, the insertion hole 83 being formed as a cutout with an open upper end. In the present example, the configuration described in alternative embodiment (3-2) may be adopted for the movement-restricting mechanism R and the switching mechanism Q.

In accordance with this configuration, the contacted surface 84 of the plate member 80 having been switched from the restricted movement state to the released-restriction state and the contacting surface 56 (not shown) of the power source plug 50 come into contact as the power source plug 50 is inserted into the plug socket 30, the upper part of the plate member 80 rotates around the hinge shaft 81 in a direction approaching the electroconductive pins 31a, and the plate member 80 lays down until it is nearly parallel with the insertion/removal direction of the power source plug 50 (see the imaginary lines in FIG. 12). In this way, the insertion of the power source plug 50 into the plug socket 30 is not impeded by the plate member 80.

Figure 13:
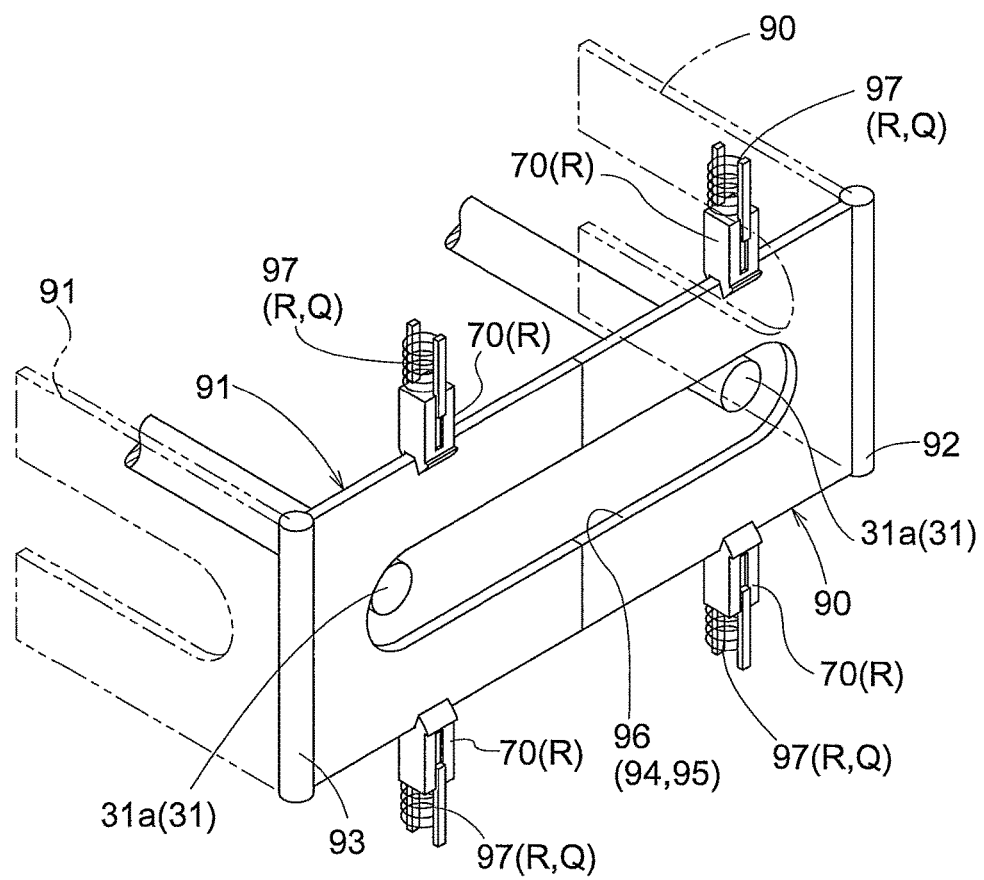
FIG. 13 is a schematic perspective view of the vicinity of a plug socket showing the rough configurations of a protective member, a movement-restricting mechanism, and a switching mechanism according to an alternative embodiment (4-2).

(4-2) As in the case of alternative embodiment (4-1), the configuration shown in FIG. 13 may be adopted for the protective member.

For example, as shown in FIG. 13, the protective member for blocking the opening 32 of the plug socket 30 may be constituted by a pair of plate members 90, 91 divided into two in a direction orthogonal to the insertion/removal direction of the power source plug 50, the plate members 90, 91 having a rectangular shape that is similar to and slightly smaller than the rectangular opening 32 when the opening 32 is closed off by the plate members 90, 91. Hinge shafts 92, 93 following the shorter direction (i.e., the vertical direction) of the plate members 90, 91 orthogonal to the insertion/removal direction of the power source plug 50 are formed on outer sides of the plate members 90, 91, respectively (i.e., on the right side of the plate member 90 and on the left side of the plate member 91). Pin insertion holes 94 are formed in the plate members 90, 91 at locations corresponding to the electroconductive pins 31a acting as socket-side electroconductive part 31, and an insertion hole 95 for the heat-sensitive post 54 is formed at a location corresponding to the heat-sensitive post 54. The pin insertion holes 94 and the insertion hole 95 are formed as a long hole 96 extending in the left-to-right direction connecting the holes as seen from the side so as not to block the rotation of the plate members 90, 91 when the plate members 90, 91 are rotated around the hinge shafts 92, 93 (see FIG. 13). In this example, as in the case of alternative embodiment (4-1) described above, the configurations described in alternative embodiment (3-2) can be adopted for the movement-restricting mechanism R and the switching mechanism Q, in which case a movement restriction member 70 of the movement-restricting mechanism R is provided at both ends in the vertical direction within the opening 32 of the plug socket 30, a pair being provided for each of the plate members 90, 91 (four total in the present alternative embodiment). It is also possible to provide a pair of pressing springs 97 for biasing the movement restriction members 70 upward or downward from the ends within the opening 32 toward the ends of the plate members 90, 91.

In accordance with this configuration, the contacted surface 98 of the plate members 90, 91 having been switched from the restricted movement state to the released-restriction state and the contacting surface 56 (not shown) of the power source plug 50 come into contact as the power source plug 50 is inserted into the plug socket 30, the center parts of the plate members 90, 91 rotate around the hinge shafts 92, 93 in a direction approaching the electroconductive pins 31a, and the plate members 90, 91 are lowered until they become substantially parallel with the insertion/removal direction of the power source plug 50 (see the imaginary lines in FIG. 13). In this way, the insertion of the power source plug 50 into the plug socket 30 is not impeded by the plate members 90, 91.

(6) In the description of the embodiment given above, an example has been given in which the socket-side electroconductive part 31 is constituted by electroconductive pins 31a projecting toward the opening 32 within the plug socket 30, and the plug-side electroconductive part 51 is constituted by power source terminals 51a disposed at positions corresponding to the electroconductive pins 31a. However, the present invention is not limited to this configuration, and another configuration is possible as long as the socket-side electroconductive part 31 and the plug-side electroconductive part 51 can be properly electrically connected.

For example, electroconductive terminals to which the ends of the electrothermal heater 4 are electrically connected are disposed as a socket-side electroconductive part 31 within the inside of a pair of closed-bottom cylindrical walls projecting toward the opening 32, the electroconductive terminal being provided with recession into which power source terminal acting as plug-side electroconductive parts 51, as will be described below, can be inserted. The recessions 57 formed on the contacting surface 56 of the power source plug 50 are formed at locations corresponding to the cylindrical walls so that the cylindrical wall can be mated therein, power source terminals projecting into the recessions 57 being formed within the recessions 57. In this case, the protective member has a similar configuration as in the embodiment and alternative embodiment described above, so that the protective member does not impede the insertion of the power source plug 50 into the plug socket 30.

The pair of cylindrical walls within the plug socket 30 are thereby mated within the recessions 57 formed in the contacting surface 56 of the power source plug 50, allowing the power source terminals of the power source plug 50 to be electrically connected to the electroconductive terminal within the cylindrical walls in the plug socket 30.

(7) In the embodiment described above, the connection-maintaining mechanism M is provided with swinging members 58, engaging claws 58a on the swinging members 58, springs 59, and engaging recessions 34, but another configuration may be adopted as long as the power source plug 50 can be inserted into the plug socket 30 and the socket-side electroconductive part 31 and plug-side electroconductive part 51 maintained in a state of electrical connection.

For example, it is also possible to provide a plug-side magnet on the contacting surface 56 of the power source plug 50 and a socket-side magnet at a location on the plug socket 30 corresponding to the plug-side magnet (also providing, as necessary, a protective member-side magnet or magnets on the protective member at a location or locations corresponding to one or both of the plug-side magnet and the socket-side magnet), the magnets being drawn together by a strong magnetic force as the power source plug 50 is inserted into the plug socket 30.

It is thereby possible to insert the power source plug 50 into the plug socket 30 and favorably maintain the socket-side electroconductive part 31 and the plug-side electroconductive part 51 in a state of electrical connection.

(8) In the embodiment described above, the upper part of the first protective plate hole 39 formed on the protective plate 35 as a protective member is formed as a substantially perfect circle (i.e., the upper half of a perfect circle) and the lower part as the lower half of an ellipse formed by vertically extending the lower half of a perfect circle; but if the part where the first protective plate hole 39 and the obstructor plate hole 41 overlap is large enough, as seen from the side, that the insertion guide can be easily inserted therein, it is also possible for the first protective plate hole 39 to be formed as a perfect circle concentric with the obstructor plate hole 41. It is also possible to form the lower part of the first protective plate hole 39 as a perfect circle (i.e., the lower half of a perfect circle) and the upper part as the upper half of an ellipse formed by extending the upper half of a perfect circle upward, or to form the first protective plate hole 39 as an ellipse formed by extending a perfect circle both upward and downward. If the upper half of the first protective plate hole 39 is formed as the upper half of an ellipse extended at least upward and downward, the upper part of the inserted insertion guide will contact the upper inner circumferential surface (upper end) of the obstructor plate hole 41 and rise, the upper inner circumferential surface (upper end) of the first protective plate hole 39 being positioned higher than the upper inner circumferential surface (upper end) of the obstructor plate hole 41.

(9) In the embodiment given above, a hotplate H has been described as an example of a heated cooking appliance constituting an electrothermal heating device. However, the heated cooking appliance to which the present invention can be applied is naturally not limited to a hotplate, and can also be a meat grill, grill pan, Japanese takoyaki maker, or the like provided with an electrothermal heater, a plug socket, and a power source plug. In addition, the electrothermal heating device to which the present invention can be applied is not limited to a heated cooking appliance, and can also be an electric pot, electric kettle, humidifier, or the like provided with an electrothermal heater, a plug socket, and a power source plug.

(10) In the embodiment described above, an example of a cooking plate 3 having an approximate rectangular shape (i.e., a rounded rectangular shape the four corners of which are formed as curves) as seen in plan view has been given, but the cooking plate 3 may have any desired shape, such as a circle, an ellipse, or a rectangle. In such cases, the main cooking device unit 1 and the water dish 2 may be given shapes substantially similar to that of the cooking plate 3.

(11) In the foregoing embodiment, a cooking plate 3 having an electrothermal heater 4 integrally cast therewith is described, but it is also possible for the electrothermal heater 4 to be a separate piece from the cooking plate 3, and disposed between the water dish 2 and the cooking plate 3 with the electrothermal heater 4 contacting or positioned near the cooking plate 3.

As described above, the present invention allows for the provision of an electrothermal heating device that can prevent, through a simple configuration, accidental contact by a user's hand with a socket-side electroconductive part disposed within a plug socket, or the adherence of dirt or the like thereupon, while an power source plug can be reliably plugged into the plug socket.

What is claimed is:

1. An electrothermal heating device including
   a box-shaped plug socket provided with a socket-side electroconductive part electrically connected to an electrothermal heater, and provided with an opening; and
   a power source plug provided with a plug-side electroconductive part electrically connectable with the socket-side electroconductive part, the plug being insertable into and removable from the plug socket via the opening;
   wherein the electrothermal heating device comprises:
   a protective member for closing the opening of the plug socket and positioning the socket-side electroconductive part within an interior space;
   a movement-restricting mechanism for restricting a movement of the protective member both towards and away from the socket-side electroconductive part in a protected state in which the socket-side electroconductive part is positioned within the interior space closed off by the protective member; and
   a switching mechanism for switching from a restricted movement state in which the movement of the protective member is restricted by the movement-restricting mechanism to a released-restriction state in which restriction by the movement-restricting mechanism is released as the power source plug is inserted into the plug socket,
   the protective member is provided with a protective plate for closing the opening of the plug socket in a horizontal direction;
   the movement-restricting mechanism is provided with an obstructor plate that is slidable in a vertical direction with respect to the protective plate and disposed on the protective plate, a protrusion formed in a lower part of the obstructor plate is configured to mate with a mating hole formed in the plug socket when the obstructor plate descends, and the restricted movement state is made in which a movement of the protective plate both toward and away from the socket-side electroconductive part is restricted, and
   the switching mechanism is provided with an insertion guide formed projecting outward at a location on the power source plug facing the protective plate, the insertion guide being configured so as to be insertable into a protective plate hole formed through the protective plate and an obstructor plate hole formed in the obstructor plate; and, in the restricted movement state in which the protrusion formed in the lower part of the obstructor plate is mated with the mating hole, the protective plate hole and the obstructor plate hole form an overlapping part and the obstructor plate hole is disposed at a position offset downwards with respect to the protective plate hole, in which configuration the insertion guide moves the obstructor plate upward relative to the protective plate as the power source plug is inserted into the plug socket, so that the restricted movement state, in which the movement of the protective plate is restricted by the obstructor plate, is switched to the released-restriction state.

2. The electrothermal heating device according to claim 1, wherein the protective plate and the obstructor plate are disposed at least in a stated order from the opening, and the protective plate hole has a long hole shape in a vertical direction.

3. The electrothermal heating device according to claim 1, wherein the insertion guide is a heat-sensitive post, provided on the power source plug, and directly or indirectly contacting an object of heating heated by the electrothermal heater.

4. The electrothermal heating device according to claim 3, wherein a tapered tip that decreases in diameter toward an end of an insertion tip is formed on a tip of the heat-sensitive post.

5. The electrothermal heating device according to claim 1, wherein the protective member is disposed so as to be slidable in a sliding direction coinciding with an insertion/removal direction in which the power source plug is inserted into and removed from the plug socket.

6. The electrothermal heating device according to claim 5, wherein the power source plug is provided with a contacting surface orthogonal to the insertion/removal direction and the protective member is provided with a contacted surface orthogonal to the sliding direction, the contacting surface of the power source plug and the contacted surface of the protective member coming into contact as the power source plug is inserted into the plug socket, and the power source plug causing the protective member to slide in the sliding direction.

7. The electrothermal heating device according to claim 5, wherein biasing members for biasing the protective member into the protected state along the sliding direction are provided at both ends of the protective member in a direction orthogonal to the sliding direction.

8. The electrothermal heating device according to claim 5, wherein the socket-side electroconductive part is constituted by electroconductive pins formed projecting outward on a side defining the opening, and the protective member is disposed so as to be slidable in the sliding direction with the electroconductive pins capable of being inserted into pin insertion holes formed in the protective member.

9. The electrothermal heating device according to claim 1, wherein the power source plug and the plug socket are provided with a connection-maintaining mechanism for keeping the socket-side electroconductive part in a state of electrical connection with the plug-side electroconductive part when the power source plug is inserted into the plug socket.

10. The electrothermal heating device according to claim 1, wherein the plug socket is provided with a grip integrally formed at a position lower than a location at which the protective member is disposed.

\* \* \* \* \*